United States Patent [19]

Cohen

[11] Patent Number: 5,548,293

[45] Date of Patent: Aug. 20, 1996

[54] SYSTEM AND METHOD FOR GENERATING ATTITUDE DETERMINATIONS USING GPS

[75] Inventor: Clark E. Cohen, Palo Alto, Calif.

[73] Assignee: LeLand Stanford Junior University, Palo Alto, Calif.

[21] Appl. No.: 165,394

[22] Filed: Dec. 10, 1993

Related U.S. Application Data

[63] Continuation-in-part of Ser. No. 36,319, Mar. 24, 1993, abandoned.

[51] Int. Cl.$^6$ .............................. G01S 5/02; H04B 7/19
[52] U.S. Cl. .......................................... 342/357; 342/352
[58] Field of Search .................................... 342/357, 352; 364/434

[56] References Cited

U.S. PATENT DOCUMENTS

| | | | |
|---|---|---|---|
| 4,667,203 | 5/1987 | Counselman, III | 342/357 |
| 4,754,465 | 6/1988 | Trimble | 375/1 |
| 4,928,106 | 5/1990 | Ashjaee et al. | 342/352 |
| 4,972,431 | 11/1990 | Keegan | 375/1 |
| 5,101,356 | 3/1992 | Timothy et al. | 364/449 |
| 5,134,407 | 7/1992 | Lorenz et al. | 342/352 |
| 5,177,489 | 1/1993 | Hatch | 342/357 |
| 5,268,695 | 12/1993 | Dentinger et al. | 342/357 |

OTHER PUBLICATIONS

Expanding The Performance Envelope of GPS-Based Attitude Determination, by Clark E. Cohen, et al., ION GPS, Albuquerque, NM, Sep. 9-13, 1991.

Flight Tests Of Attitude Determination Using GPS Compared Against An Inertial Navigation Unit, by Clark E. Cohen, et al., Presented ION National Technical meeting, San Francisco, CA, Jan. 20-22, 1993.

Integer Ambiguity Resolution Of The GPS Carrier For Spacecraft Attitude Determination, by Clark E. Cohen, et al., 15th Annual AAS Guidance and Control Conference, Feb. 8-12, 1992, Keystone, Colorado.

Attitude Determination Using GPS, by Clark E. Cohen, Dec., 1992.

Ambiguity Resolution On-The-Fly—A Comparison Of P Code And High Performance C/A Code Receiver Technologies, by Dr. Gerard Lachapelle, et al., Univ. of Calgary.

Aircraft Applications Of GPS-Based Attitude Determination, by Clark E. Cohen, et al., Stanford University.

Kinematic GPS For Differential Positioning: Resolving Integer Ambiguities On The Fly, by Patrick Y. C. Hwang, Rockwell International Corp., Cedar Rapids, Iowa, Jan. 1991.

Real-Time Kinematic GPS Surveying Technical Overview, publication by Trimble Navigation.

(List continued on next page.)

*Primary Examiner*—Gregory C. Issing
*Attorney, Agent, or Firm*—Flehr Hohbach Test Albritton & Herbert

[57] ABSTRACT

A GPS attitude receiver for determining the attitude of a moving vehicle in conjunction with a first, a second, a third, and a fourth antenna mounted to the moving vehicle. Each of the antennas receives a plurality of GPS signals that each include a carrier component. For each of the carrier components of the received GPS signals there is an integer ambiguity associated with the first and fourth antennas, an integer ambiguity associated with second and fourth antennas, and an integer ambiguity associated with the third and fourth antennas. The GPS attitude receiver measures phase values for the carrier components of the GPS signals received from each of the antennas at a plurality of measurement epochs during an initialization period and at a measurement epoch after the initialization period. In response to the phase values measured at the measurement epochs during the initialization period, the GPS attitude receiver computes integer ambiguity resolution values representing resolution of the integer ambiguities. Then, in response to the computed integer ambiguity resolution values and the phase value measured at the measurement epoch after the initialization period, it computes values defining the attitude of the moving vehicle at the measurement epoch after the initialization period.

28 Claims, 8 Drawing Sheets

OTHER PUBLICATIONS

Instantaneous Ambiguity Resolution, by Ron Hatch, Presented KIS Symposium 1990, Banff, Canada, Sep. 11, 1990.

A GPS Precision Approach And Landing System, by Dr. Alison K. Brown, Inst. of Nav. GPS–92, Albuquerque NM, Sep., 1992.

Site Surveyor, Real–Time GPS Survey System, by Trimble Navigation, Oct. 1992.

System Surveyor, GPS Survey System, by Trimble Navigation, Copyright 1992.

Real–Time Cycle Ambiguity Resolution Using A Pseudolite For Precision Landing Of Aircraft With GPS, by Clark E. Cohen, et al., Presented at Second International Symposium on Differential Satellite Navigation Systems, Mar. 30–Apr. 2, 1993, Amsterdam, The Netherlands.

Real–Time Flight Test Evaluation Of The GPS Marker Beacon Concept For Category III Kinematic GPS Precision Landing, by Clark E. Cohen, et al., Presented at ION GPS–93, Sep. 22–24, 1993, Sale Lake City, Utah.

A GPS Receiver With Built–In Precision Pointing Capability, by Ron Brown, et al., Presented at IEEE Plans '90, Las Vegas, Nevada, Mar. 20, 1990.

Attitude Determination Using Vector Observations And The Singular Value Decomposition, by F. Landis Markley, The Journal of the Astronautical Sciences, vol. 36, No. 3, Jul.–Sep., 1988, pp. 245–258.

Two Studies Of High Performance Attitude Determination Using GPS: Generalizing Wahba's Problem For High Output Rates And Evaluation Of Static Accuracy Using A Theodolite, by Clark E. Cohen, et al., Presented at ION GPS–92, Albuquerque Convention Center, Albuqueruqe, New Mexico, Sep. 16–18, 1992.

Transcript Of Ph.D. Oral Defense, Oct. 7, 1992, by Clark E. Cohen, Presented at Stanford University, Stanford, California.

GPS Inertial Attitude Estimation Via Carrier Accumulated Phase Measurements, by Haywood S. Satz, et al., Navigation: Journal of The Institute of Navigation, vol. 38, No. 3, Fall 1991.

Matrix Computations, by Gene H. Golub, et al., The Johns Hopkins University Press, Baltimore and London.

Ferguson et al, "Three Dimensional Attitude Determination With The Ashtech 3DF 24 Channel GPS Measurement System", National Tech. Mtg. (ION) Ariz. Jan. 22, 1991.

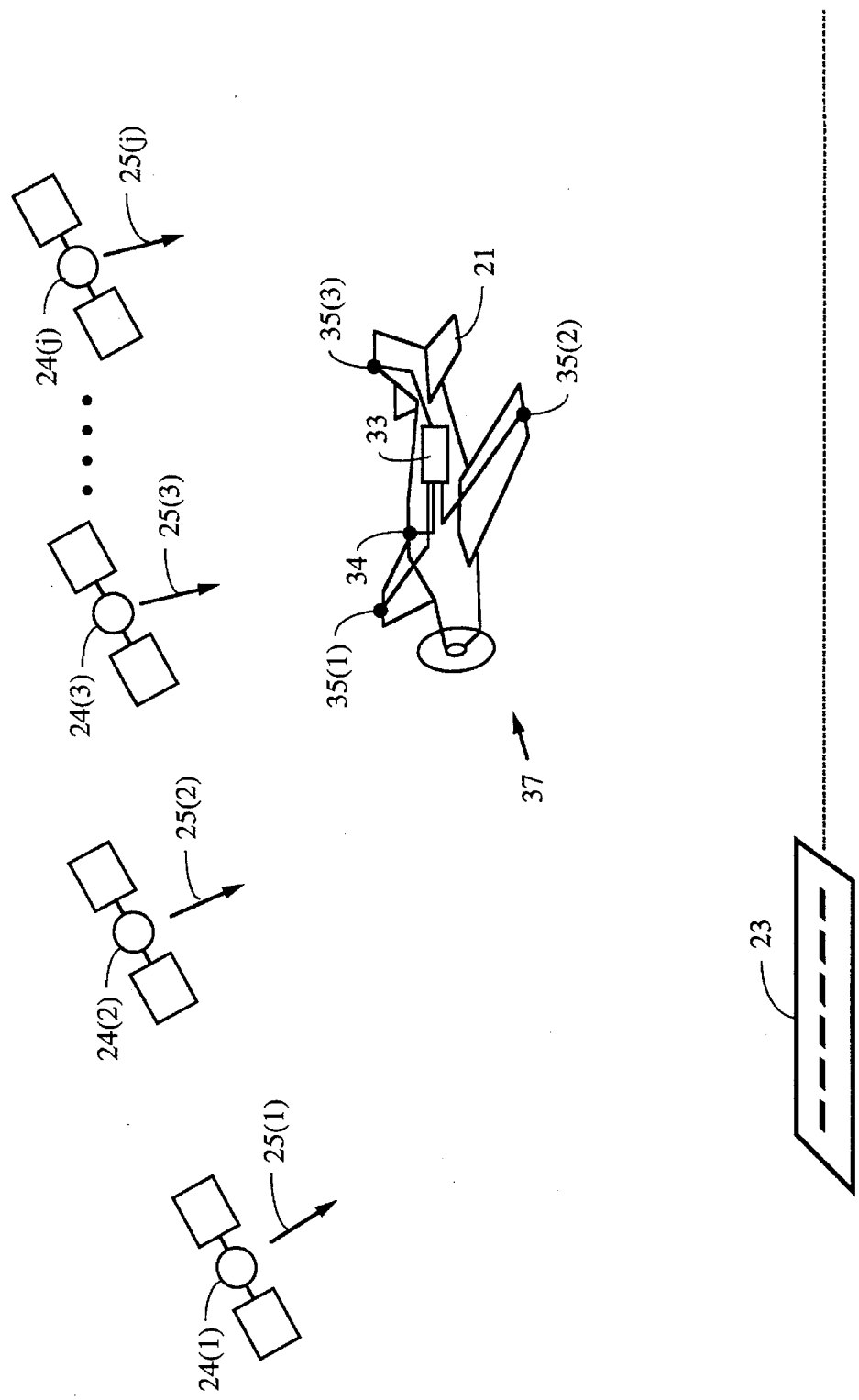
FIG._1

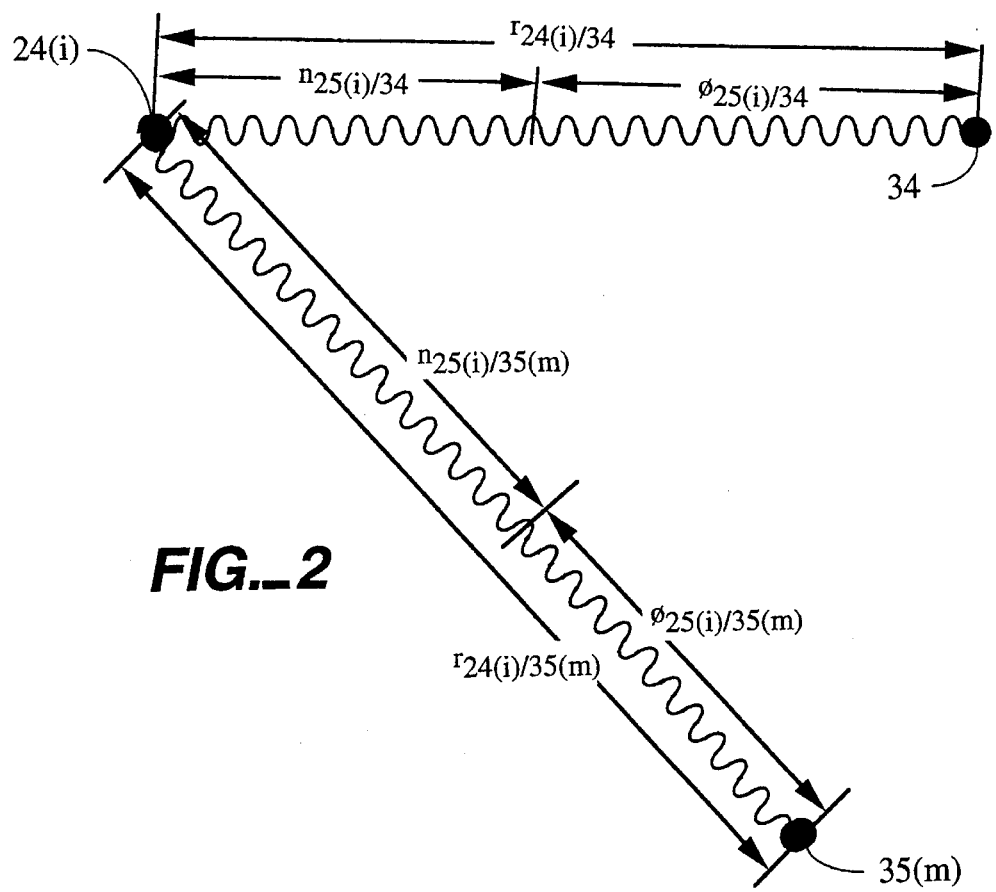
FIG._2
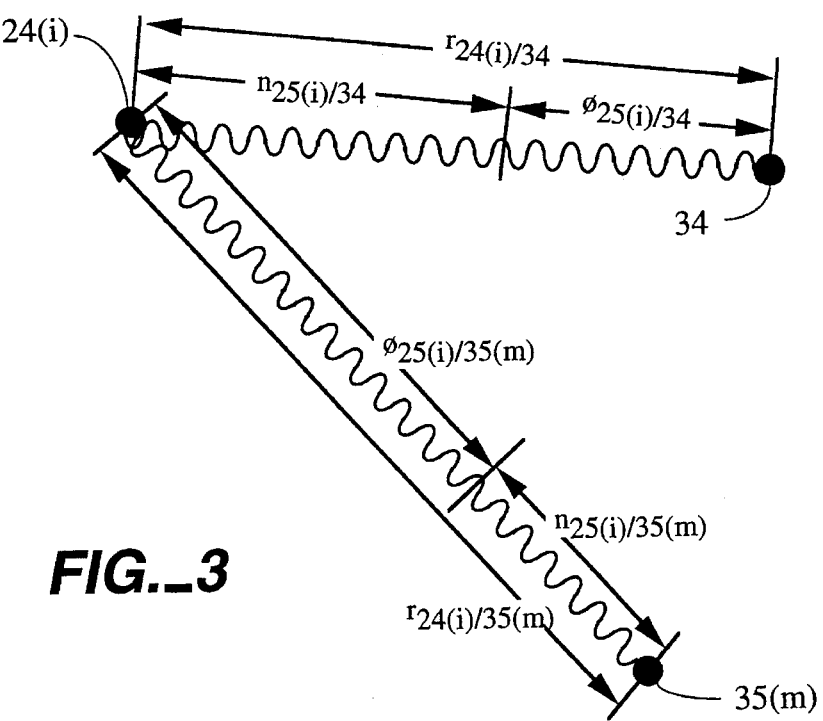
FIG._3

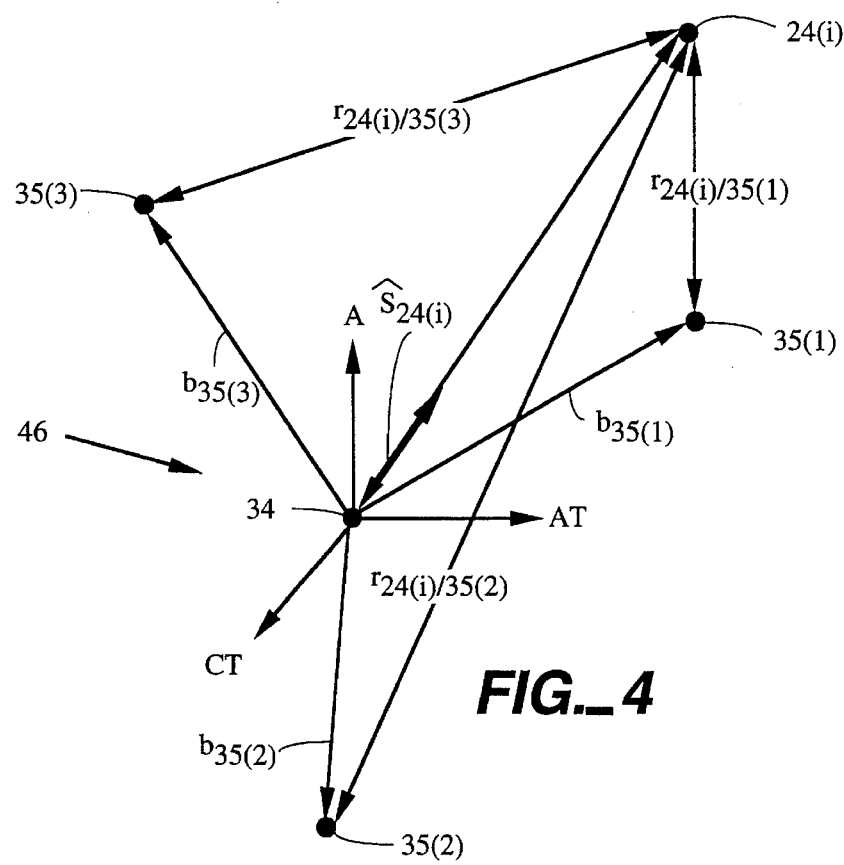
FIG._4
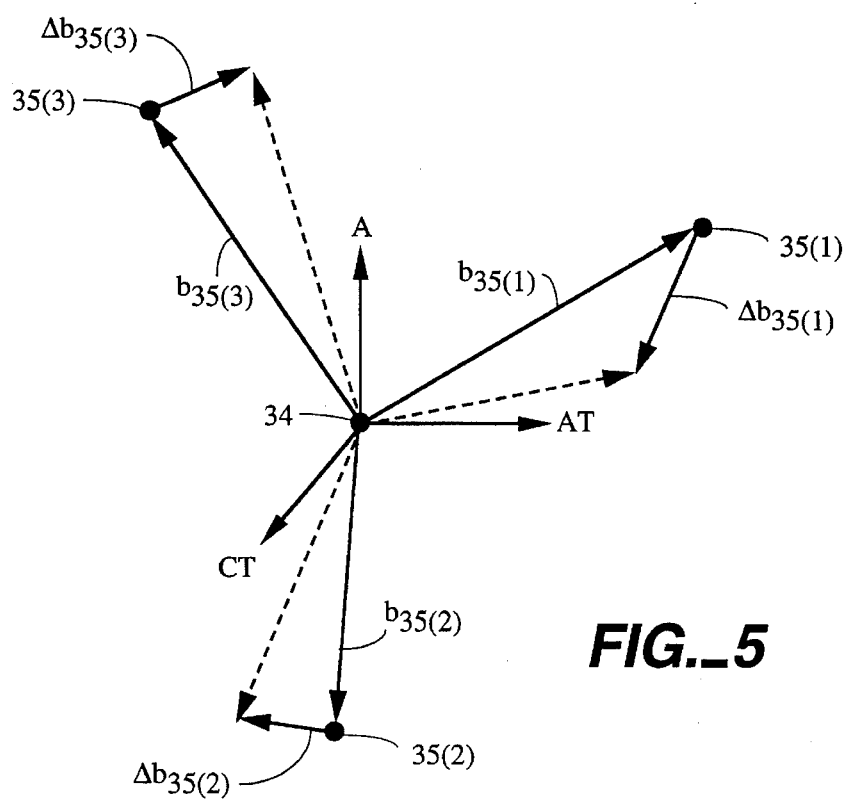
FIG._5

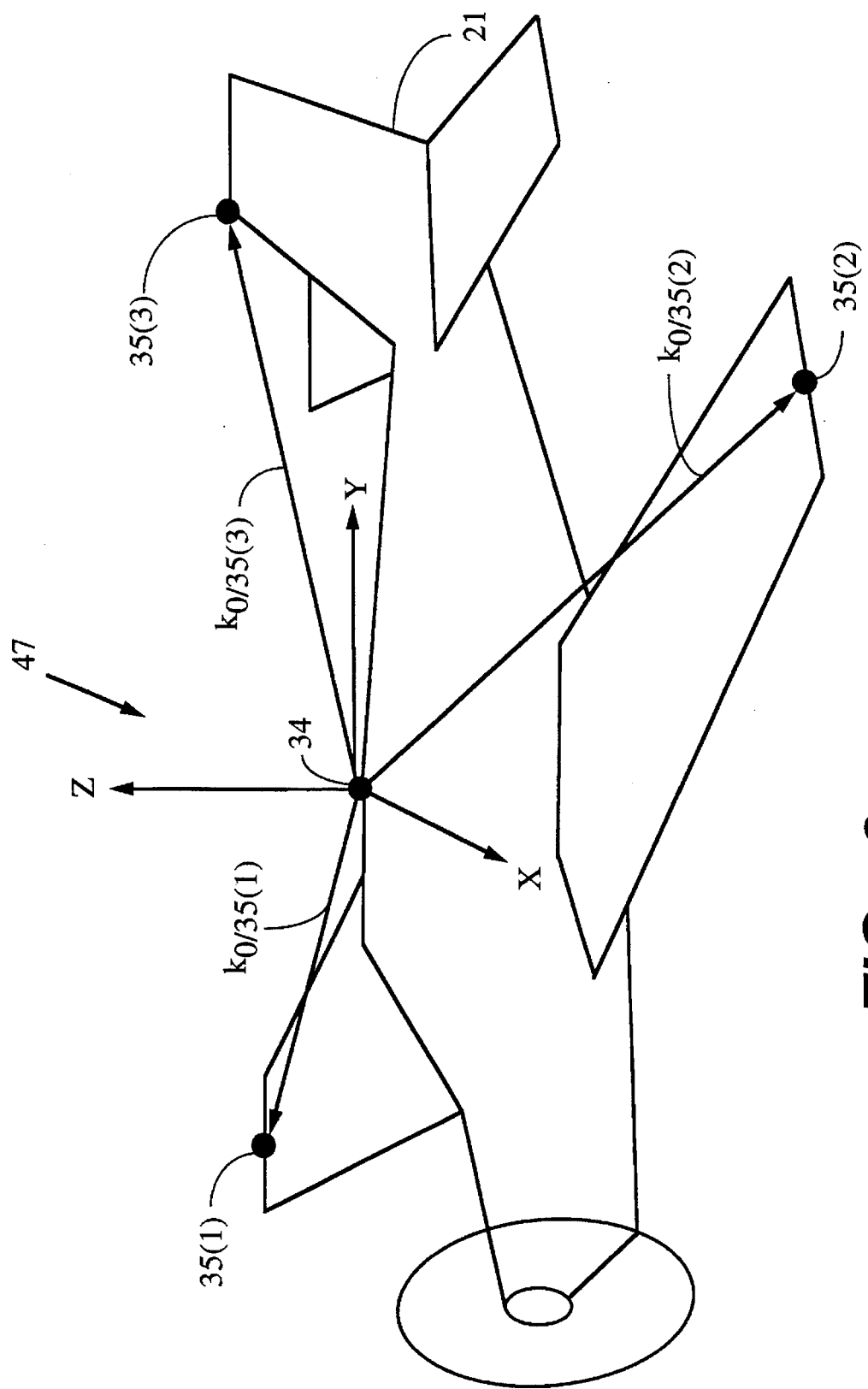
FIG._6

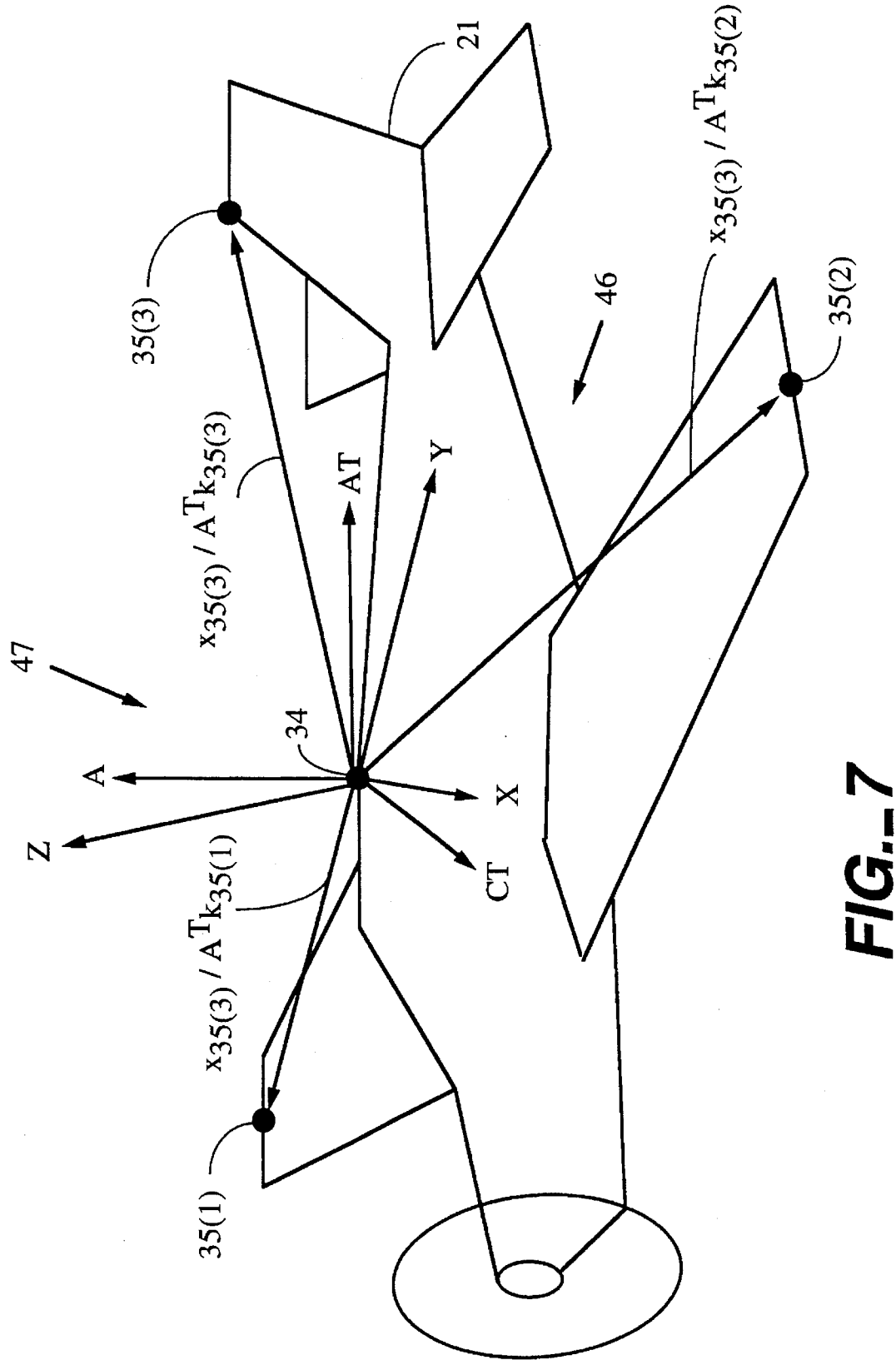
FIG._7

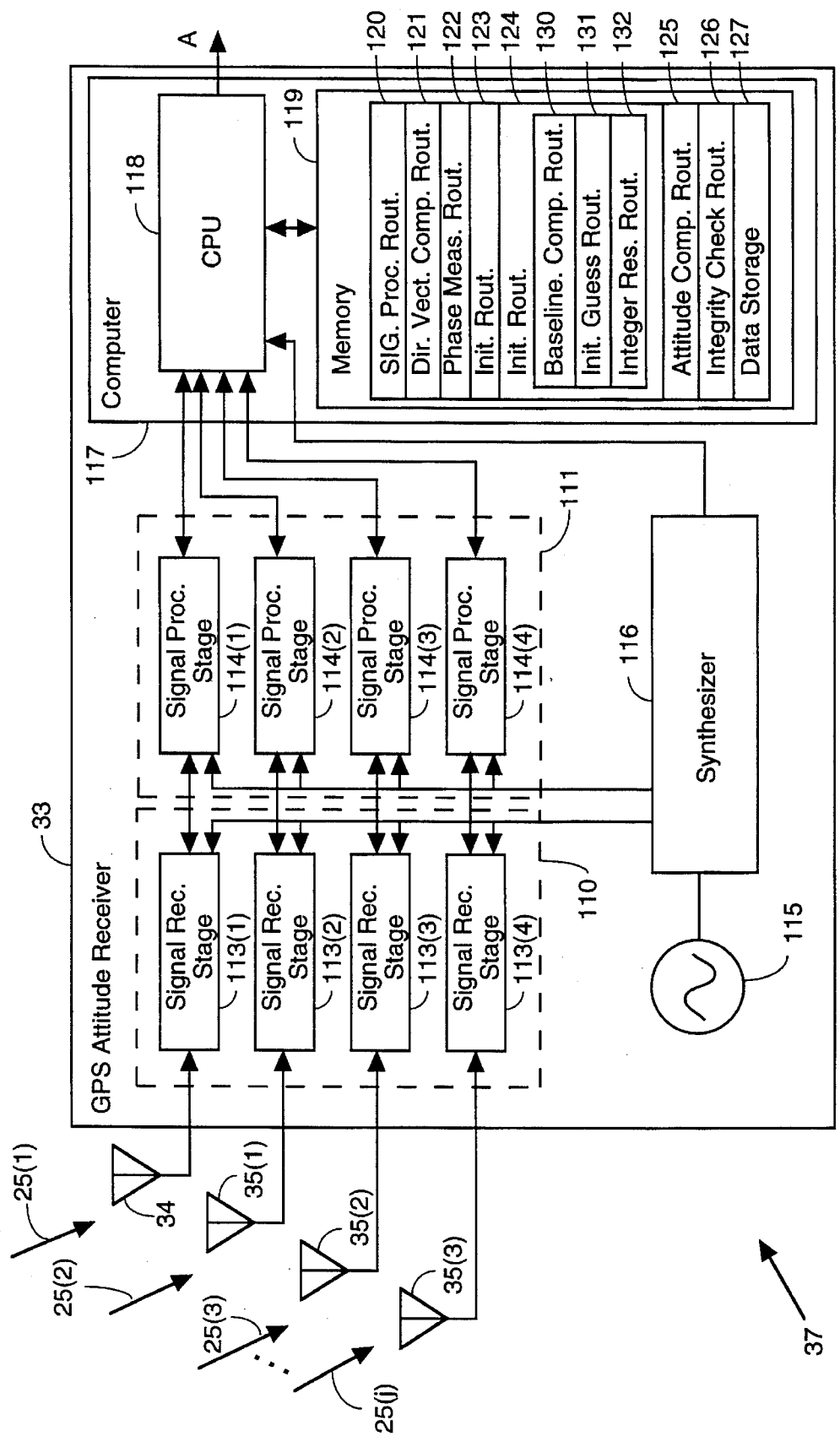
FIG._8

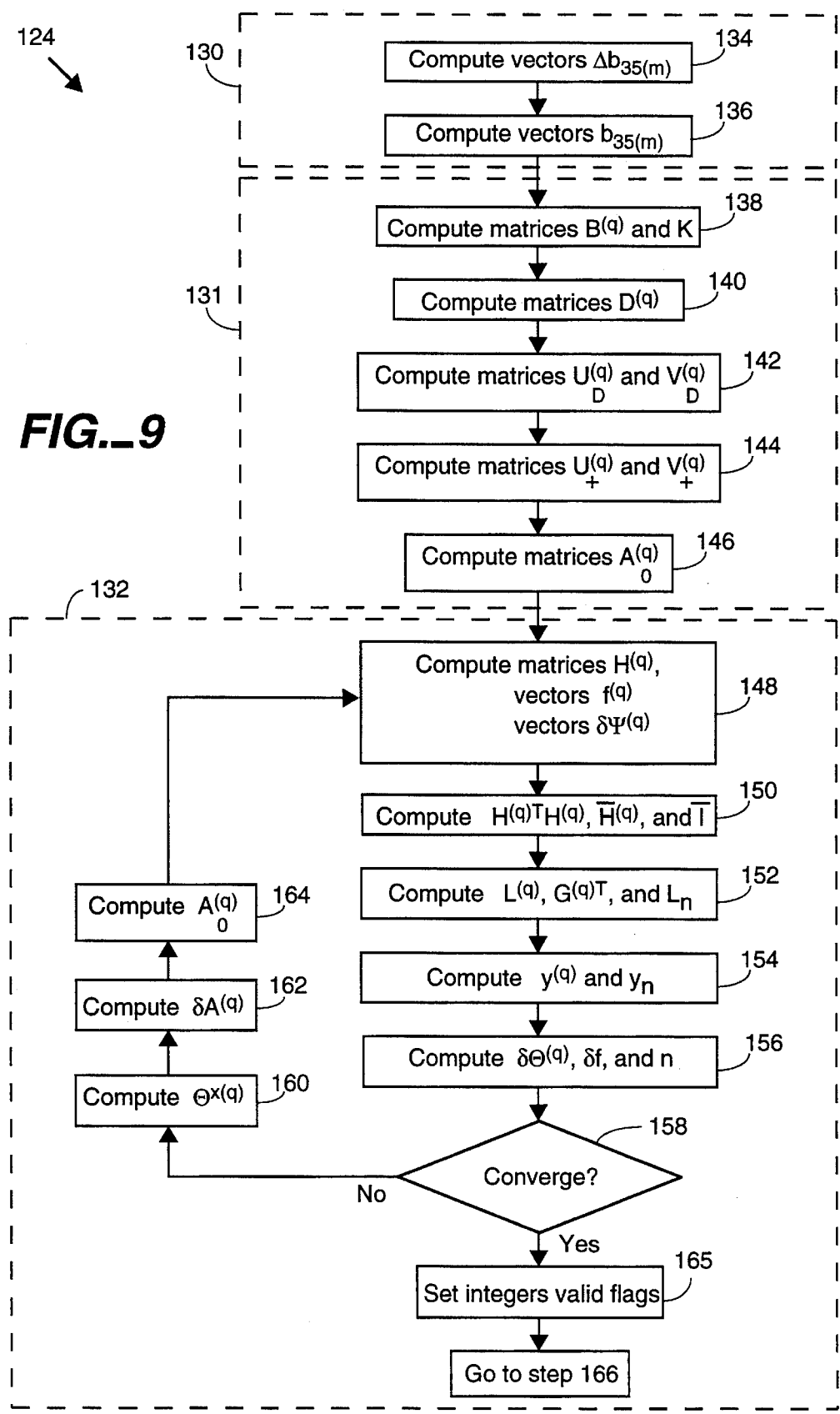
FIG._9

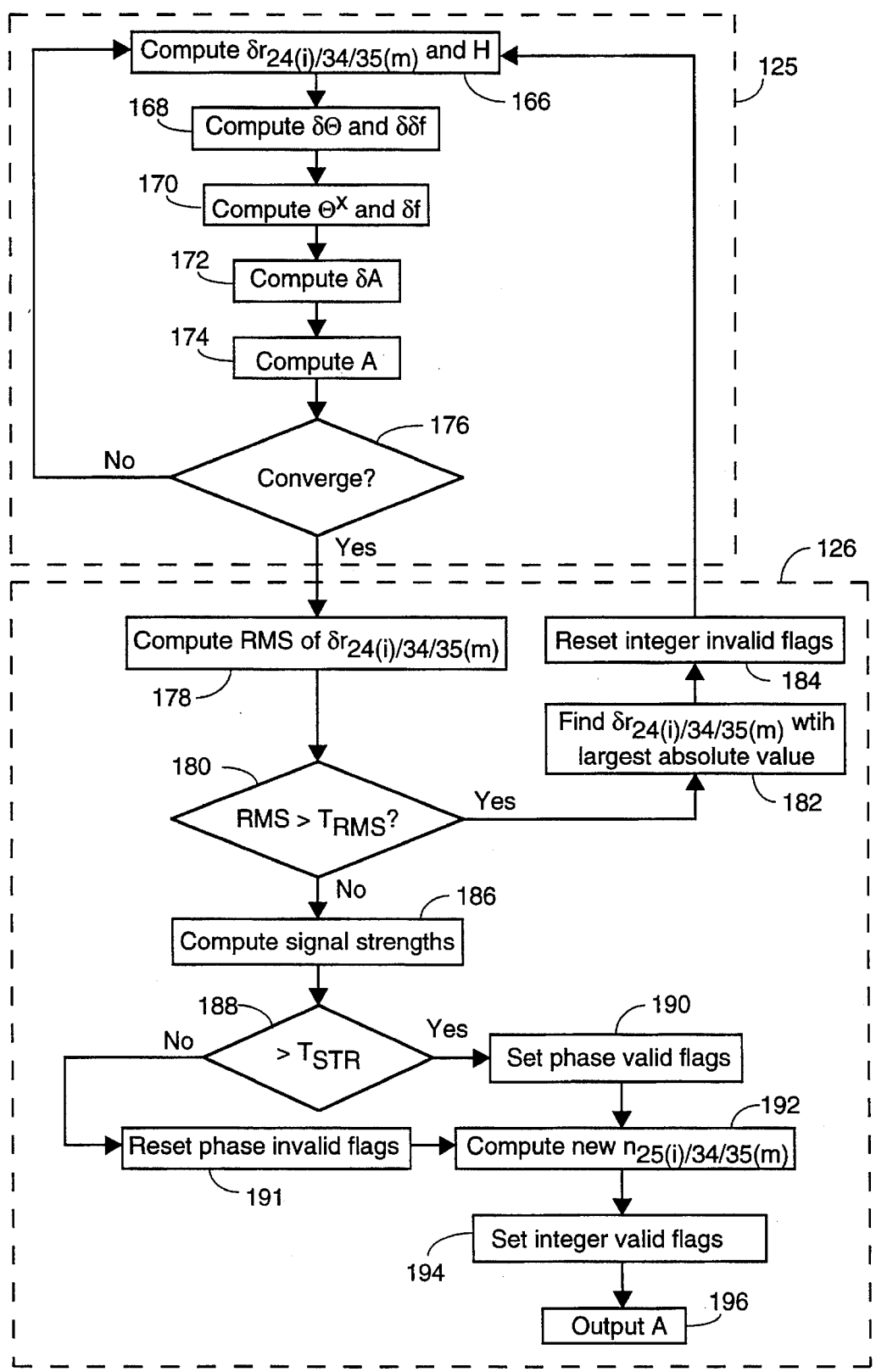
*FIG._10*

SYSTEM AND METHOD FOR GENERATING ATTITUDE DETERMINATIONS USING GPS

The United States Government may have certain rights in any patent issuing from this application pursuant to the Grant NAS8-36125 between NASA and Stanford University.

This application is a continuation-in-part of U.S. patent application Ser. No. 08/036,319 filed Mar. 24, 1993, now abandoned.

FIELD OF THE INVENTION

The present invention relates generally to systems and methods for generating precise attitude determinations for moving vehicles. In particular, it pertains to a system and method for generating attitude determinations for moving vehicles, including aircraft and spacecraft, using the Global Positioning System (GPS).

BACKGROUND OF THE INVENTION

GPS involves a constellation of 24 satellites placed in orbit about the earth by the United States Department of Defense. Each satellite continuously broadcasts a GPS signal. This GPS signal contains an L-band carrier component (L1) transmitted at a frequency of 1.575 GHz. The L1 carrier component is modulated by a coarse acquisition (C/A) pseudo random (PRN) code component and a data component.

The PRN code provides timing information for determining when the GPS signal was broadcast. The data component provides information such as the satellite's orbital position. The carrier component allows a receiver to easily acquire the GPS signal.

Position determination using Conventional GPS is well known in the art. In Conventional GPS, a receiver makes ranging measurements between an antenna coupled to the receiver and each of at least four GPS satellites in view. The receiver makes these measurements from the timing information and the satellite orbital position information obtained from the PRN code and data components of each GPS signal received. By receiving four different GPS signals, the receiver can make fairly accurate position determinations.

However, Conventional GPS only allows a user to determine his actual location to within tens of meters. However, this is not suitable for applications such as attitude determination for moving vehicles which requires extreme precision.

A more accurate version of GPS is Ordinary Differential GPS. Position determination using Ordinary Differential GPS is also well known in the art. It involves the same kind of ranging measurements as are made with Conventional GPS, except that a ground reference receiver at a precisely known location is utilized. Ideally, satellite ranging errors will affect the position determinations made by the user's receiver in the same way as they will the position determinations made by the nearby ground receiver. Since the location of the ground receiver is already known, the ground receiver can compare the position determination it has calculated with the actual known position. As a result, the ground receiver can accurately detect ranging errors.

From these errors, the ground receiver can compute suitable corrections which are transmitted by data link to the user's receiver. The user's receiver can then apply the corrections to its own ranging measurements so as to provide accurate real time position determinations.

However, even with Ordinary Differential GPS, the position determinations are only accurate to within several meters. Since, as indicated earlier, attitude determination must be extremely accurate, extending Ordinary Differential GPS to attitude determination is not feasible.

An extremely accurate form of GPS is Carrier Phase Differential GPS. This form of GPS utilizes the 1.575 GHz carrier component of the GPS signal on which the PRN code and the data component are superimposed.

Carrier Phase Differential GPS involves generating position determinations based on the measured phase differences at two different antennas for the carrier component of a GPS signal. However, this technique initially requires determining how many integer wavelengths of the carrier component exist between the two antennas at a particular point in time. This is called integer ambiguity resolution.

A number of approaches currently exist for integer ambiguity resolution. However, all of them suffer from problems which render them unfit for applications requiring extremely precise attitude determinations.

One approach is Integer Searching using redundant measurements. This involves receiving more than the standard four GPS signals in order to sort out the correct combination of integer ambiguities. The different combinations of integer candidates are systematically checked against a cost function until an estimated correct set is found. However, for antenna separations of just a few meters, the checked combinations can number in the hundreds of millions. As a result, this approach has a propensity to arrive at wrong solutions. Furthermore, the configuration of the constellation of GPS satellites can only guarantee that four satellites will be in view at any given time. Therefore, any application requiring attitude determinations at any given time must not rely on redundant satellites for reliable resolution of the integer ambiguities.

Another approach is Narrow Correlator Spacing. This technique involves using the PRN code of the GPS signal to bound the integer ambiguities. However, a significant amount of the time it can yield position determination errors of as much as several meters. This does not provide the kind of consistency which is required in attitude determinations for moving vehicles.

Still another approach is Dual Frequency Wide-Laning. This approach also utilizes a second GPS signal broadcast by each satellite. This second GPS signal has an L-band carrier component (L2) transmitted at a frequency of 1.227 GHz. The L2 carrier component and the L1 carrier component are differenced so as to form a signal having an effective wavelength that is much longer than either of the two carrier components. From this signal, it is relatively easy to resolve the integer ambiguities. However, the L2 component is not available for civilian use. Although the denial of the second carrier component can be countermeasured with cross correlation technology, the performance of this type of technology is unproven and very expensive to implement.

One successful approach to integer ambiguity resolution is motion-based and has been utilized in static surveying applications. This approach involves taking a number of phase measurements while the user's antenna and the reference antenna are stationary. These phase measurements are made over a period of about 15 minutes. The phase measurements made during the slowly changing geometry of the GPS satellites will reveal the integer ambiguities. But, in many applications requiring attitude determination, it would be impractical to require the user's antennas to remain stationary for 15 minutes while the integer ambiguities are resolved.

Several motion-based approaches for integer ambiguity resolution have specifically been proposed for attitude determination. They involve placing antennas at various points around a spacecraft or airplane. The integer ambiguities can be resolved with rotation of the space craft or aircraft and taking several phase measurements.

However, one of these methods is restricted to rotation about multiple coordinate axes. This approach is not practical since, for example, simple rotation of an aircraft on the runway prior to takeoff is not sufficient to resolve the integer ambiguities in this method.

Another one of these methods is limited to small angle rotation of the moving vehicle with respect to the GPS satellite geometry. However, large angle rotation provides significantly more information for resolving the integer ambiguities. Since the small angle rotation method is not able to take advantage of such information, it does not provide as accurate a resolution of the integer ambiguities as would an approach utilizing large angle rotation.

In still another of these methods, the integer ambiguities can only be resolved if the airplane or spacecraft has a constant rate of rotation. This method is therefore unnecessarily limiting.

SUMMARY OF THE INVENTION

The foregoing and other problems are solved by a GPS attitude receiver in accordance with the present invention which determines the attitude of a moving vehicle. The GPS attitude receiver is used in conjunction with a first, a second, a third, and a fourth antenna mounted to the moving vehicle. Each of the antennas receives a plurality of GPS signals that each include a carrier component. For each of the carrier components of the received GPS signals there is an integer ambiguity associated with the first and fourth antennas, an integer ambiguity associated with second and fourth antennas, and an integer ambiguity associated with the third and fourth antennas.

The GPS attitude receiver measures phase values for the carrier components of the GPS signals received from each of the antennas at a plurality of measurement epochs during an initialization period and at a measurement epoch after the initialization period. In response to the phase values measured at the measurement epochs during the initialization period, it computes baseline vectors representing positions for the first, second, and third antennas with respect to the fourth antenna at an initial one of the measurement epochs during the initialization period.

In response to the computed baseline vectors and the phase values measured at the measurement epochs during the initialization period, the GPS attitude receiver computes integer ambiguity resolution values representing resolution of the integer ambiguities. Then, in response to the computed integer ambiguity resolution values and the phase values measured at the measurement epoch after the initialization period, it computes values defining the attitude of the moving vehicle at the that measurement epoch.

BRIEF DESCRIPTION OF THE DRAWINGS

The foregoing and other objects of the invention will become more apparent on reading the following detailed description and upon reference to the drawings, in which:

FIG. 1 shows a general view of a GPS attitude system in accordance with the present invention for determining the attitude of a moving vehicle;

FIG. 2 provides an illustration of how integer ambiguities arise at an initial epoch which are then resolved during an initialization period required for generating the GPS attitude determinations for the moving vehicle;

FIG. 3 provides an illustration of an epoch after the initial epoch of FIG. 2;

FIG. 4 provides an illustration of the vector relationships associated with the integer ambiguities;

FIG. 5 shows rotation of the attitude antennas of the attitude system of FIG. 1 about a single axis of the local horizontal coordinate system during the initialization period required for making the GPS attitude determinations;

FIG. 6 shows the vectors representing the surveyed positions of the antennas which are mounted on the moving vehicle with respect to the body coordinate system of the moving vehicle;

FIG. 7 shows the rotation of the body coordinate system of the moving vehicle with respect to the local horizontal coordinate system;

FIG. 8 provides a detailed illustration of the GPS attitude system of FIG. 1;

FIG. 9 shows the method employed by the GPS attitude system of FIG. 8 for resolving the integer ambiguities;

FIG. 10 shows the method employed by the GPS attitude system of FIG. 8 for making the GPS attitude determinations once the integer ambiguities are resolved.

DETAILED DESCRIPTION OF THE INVENTION

FIGS. 1–10 provide illustrations of the invention described herein. In these figures, like components are designated by like numerals.

General Description of System and Method

FIG. 1 shows an airplane (or spacecraft) 21. Multiple GPS satellites 24(1)–(j) at known orbital positions are in view and broadcast GPS signals 25(1)–(j).

Mounted on airplane (or spacecraft) 21 is GPS mobile attitude system 37 which includes GPS attitude receiver 33, GPS top side antenna 34, and GPS attitude antennas 35(1)–(3). Each of the components 33, 34, and 35(1)–(3) of the GPS attitude system 37 is mounted to the airplane (or spacecraft) 21 and is therefore mobile. Each of the antennas 34 and 35(1)–(3) receives GPS signals 25(1)–(j) and is coupled to attitude receiver 33.

The GPS signals 25(1)–(j) are L1 C/A code GPS signals. In other words, they contain an L1 carrier component, a C/A PRN code, and a data component.

The L1 carrier signal is a sinusoidal wave transmitted at a frequency of 1.575 GHz. In the preferred embodiment, the L1 carrier signal allows the GPS attitude receiver 33 to easily acquire the GPS signals 25(1)–(j). And, as is discussed later, it also allows the GPS attitude receiver 33 to compute precise position determinations for airplane (or spacecraft) 21 using Carrier Phase Differential GPS.

The PRN code provides timing information enabling GPS attitude receiver 33 to make Conventional GPS position determinations for use in making the later discussed attitude determinations. The PRN code signal comprises a series of variable width pulses broadcast at a frequency of 1.023

MHz. Each of the GPS satellites 24(1)–(j) transmits its own unique PRN code which enables GPS attitude receiver 33 to easily identify and separate the various GPS signals it receives.

The GPS attitude receiver 33 generates internally the same PRN codes at substantially the same time as do GPS satellites 24(1)–(j). The GPS attitude receiver 33 compares the PRN codes that it generates with the corresponding PRN codes received from the GPS satellites 24(1)–(j). The phase difference needed to match the received and generated PRN codes is then computed in terms of time.

The computed phase difference represents the time it takes for the PRN codes of the GPS satellites 24(1)–(j) to travel to the antennas 34 and 35(1)–(3). From the measured phase differences, the ranges to the broadcasting GPS satellite 24(1)–(j) can be established. With four such ranging measurements and the information contained in the data components of the GPS signals 25(1)–(j), the positions of antennas 34 and 35(1)–(3) can be computed.

The information in the data component of each of the GPS signals 25(1)–(j) includes the orbital position of whichever of the GPS satellites 24(1)–(j) has broadcast it. This information is provided as a bit stream with a frequency of 50 bits per second.

The initialization of GPS attitude receiver 33 for making attitude determinations involves integer ambiguity resolution. Integer ambiguity resolution is the process of determining, at a particular point in time, the number of integer wavelengths of the carrier component of a GPS signal 25(1)–(j) which lie between a given pair of antennas in the direction of the broadcasting GPS satellites 24(1)–(j).

FIG. 2 shows the situation for the first measurement epoch of the initialization period. It provides an illustration of how the later discussed integer ambiguities $n_{25(i)/34/35(m)}$ arise.

Specifically, GPS satellite 24(i) (i.e. the $i^{th}$ of the GPS satellites 24(1)–(j)) broadcasts the carrier component of GPS signal 25(i) (i.e. the $i^{th}$ of the GPS signals 25(1)–(j)) in the direction of antennas 34 and 35(1)–(3). The integer ambiguity $n_{25(i)/34/35(m)}$ of GPS signal 25(i) is associated with top side antenna 34 and the $m^{th}$ of the antennas 35(1)–(3).

Receiver 33 is configured to make phase measurements for the acquired GPS signals 25(1)–(j). Each measurement includes both a fractional wavelength phase component $\Phi_{fr}$ and an integer wavelength phase change component $\Phi_{int}$. The integer wavelength change in phase $\Phi_{int}$ for each raw phase measurement is kept track of by receiver 33 as of the time the GPS signals 25(1)–(j) was first acquired. In the preferred embodiment, the phase measurements are made by receiver 33 at a rate in the range of 1–10 Hz with each time step or cycle being a measurement epoch.

Receiver 33 generates internally its own carrier component for phase comparisons with the received carrier component of GPS signals 25(1)–(j). These carrier components are biased because at each measurement epoch the receiver 33 has clock synchronization error $\Delta T_{33}$ and the signal generator of GPS satellite 24(i) has a clock synchronization error $\Delta T_{24(i)}$.

As shown in FIG. 2, the unknown range $r_{24(i)/34}$ between the transmit antenna of GPS satellite 24(i) and antenna 34, at the initial epoch of the initialization, includes the phase component $\Phi_{25(i)/34}$ measured by receiver 33 and the unknown integer component $n_{25(i)/34}$ of GPS signal 25(i). And, the unknown range $r_{24(i)/35(m)}$ at the initial epoch between the transmit antenna of GPS satellite 24(i) and the $m^{th}$ of the antennas 35(1)–(3) includes the phase component $\Phi_{25(i)/35(m)}$ measured by receiver 33 and the unknown integer component $n_{25(i)/35(m)}$ of GPS signal 25(i).

The unknown integer components $n_{25(i)/34}$ and $n_{25(i)/35(m)}$ which are assigned at the initial epoch remain constant throughout the initialization process and the subsequent attitude determination process. This is illustrated in FIG. 3.

FIG. 3 shows an epoch after the initial epoch. This second epoch could be during or after the initialization period. Each of the measurements $\Phi_{25(i)/34}$ and $\Phi_{25(i)/35(m)}$ will have changed since the initial epoch. This is due to the fact that the fractional component $\Phi_{fr}$ and integer wavelength change component $\Phi_{int}$ which make up the identified phase measurements have changed since the initial epoch. However, the assigned integer components $n_{25(i)/34}$ and $n_{25(i)/35(m)}$ have not changed.

The relationship between $\Phi_{25(i)/34}$ and $n_{25(i)/34}$ and the relationship between $\Phi_{25(i)/40}$ and $n_{25(i)/40}$ are provided as follows in Equations (1), and (2) respectively:

$$\Phi_{25(i)/34} = r_{24(i)/34} - n_{25(i)/34} + \Delta T_{33} - \Delta T_{24(i)} \quad (1)$$

$$\Phi_{25(i)/35(m)} = r_{24(i)/35(m)} - n_{25(i)/35(m)} + \Delta T_{33} - \Delta T_{24(m)} \quad (2)$$

Differencing Equations (1) and (2) provides the single difference phase relationship given as follows in Equation (3):

$$\Phi_{25(i)/34/35(m)} = \Phi_{25(i)/34} - \Phi_{25(i)/35(m)} = \Delta r_{24(i)/34/35(m)} - n_{25(i)/34/35(m)} \quad (3)$$

where (A) $n_{25(i)/34/35(m)}$ represents the unknown integer ambiguity for GPS signal 25(i) associated with antennas 34 and 35(m) and (B) $\Delta r_{24(i)/34/35(m)}$ represents the difference in the unknown ranges $r_{24(i)/34}$ and $r_{24(i)/35(m)}$.

In order to resolve the integers ambiguities $n_{25(i)/34/35(m)}$ properly, Equation (3) must be manipulated so as to include the baseline vector relationships which are associated with the ranges $r_{24(i)/34}$ and $r_{24(i)/35(m)}$. These relationships are shown in FIG. 4 and are established with respect to the runway or local horizontal orbit coordinate system 46 which is defined by the along track AT, cross track CT, and altitude AL coordinate axes.

The baseline vectors $b_{35(1)}$, $b_{35(2)}$, and $b_{35(3)}$ respectively represent the unknown positions of attitude antennas 35(1)–(3) with respect to antenna 34 in the local horizontal coordinate system 46 at the initial epoch of the initialization period. The baseline vector $b_{35(m)}$ [3×1] (i.e. the $m^{th}$ of the baseline vectors $b_{35(1)}$, $b_{35(2)}$, and $b_{35(3)}$) is provided as follows in Equation (4):

$$b_{35(m)} = \begin{bmatrix} b_{35(m)/AT} \\ b_{35(m)/CT} \\ b_{35(m)/AL} \end{bmatrix} \quad (4)$$

where $b_{35(m)/AT}$, $b_{35(m)/CT}$, and $b_{35(m)/AL}$ are respectively the unknown distances between antennas 35(m) and 34 in the along track AT, cross track CT, and altitude AL directions.

The direction to GPS satellite 24(i) (i.e. the $i^{th}$ of GPS satellites 24(1–(j)) in relation to antenna 34 is represented by the known unit direction vector $\hat{s}_{24(i)/34}$ [3×1] provided as follows in Equation (5):

$$\hat{s}_{24(i)/34} = \begin{bmatrix} \hat{s}_{24(i)/34/AT} \\ \hat{s}_{24(i)/34/CT} \\ \hat{s}_{24(i)/34/AL} \end{bmatrix} \quad (5)$$

where $\hat{s}_{24(i)/34/AT}$, $\hat{s}_{24(i)/34/CT}$, $\hat{s}_{24(i)/34/AL}$ are respectively the unit distances to GPS satellite 24(i) in the along track AT, cross track CT, and altitude AL directions. This vector is computed by receiver 33 for a GPS satellite 24(i) from the satellite position information contained in the data component of the associated GPS signal 25(i) and from the coarse position fix generated by receiver 33 for antenna 34 using Conventional GPS positioning.

From the preceding vector relationships shown in FIG. 4 and developed in Equations (4) and (5), the following mathematical relationship is provided in Equation (6):

$$\Delta r_{24(i)/34/35(m)} = \hat{s}_{24(i)}{}^T b_{35(m)} \qquad (6)$$

Combining Equation (6) with Equation (3) results in the following relationship in Equation (7):

$$\Phi_{25(i)/34/35(m)} = \hat{s}_{24(i)}{}^T b_{35(m)} - n_{25(i)/34/35(m)} \qquad (7)$$

The integer ambiguities $n_{25(i)/34/35(m)}$ can be computed during an initialization period using two different approaches. The first approach requires that the airplane (or spacecraft) 21 remain stationary during the initialization process. The second is motion-based.

The static method is similar to that used in surveying applications. After several epochs of measuring $\Phi_{25(i)/34}$ and $\Phi_{25(i)/35(m)}$, receiver 33 can generate equations from Equation (6) which are stacked in matrix form for solving the integer ambiguities $n_{25(i)/34/35(m)}$.

In order to ensure greater accuracy for the computed values $n_{25(i)/34/35(m)}$, receiver 33 employs more than the minimum number of epochs needed to compute these values. As a result, the system benefits from the over-determined set of unknowns.

Furthermore, receiver 33 makes measurement epochs over a large enough time period to allow the slowly changing GPS satellite geometry to reveal the integer ambiguities $n_{25(i)/34/35(m)}$. This typically requires approximately fifteen minutes.

Additionally, where possible, phase measurements $\Phi_{25(i)/34}$ and $\Phi_{25(i)/35(m)}$ for additional GPS signals 25(i) are made by receiver 33. Again, the system benefits from the over-determined set of unknowns.

The second approach to resolving the integer ambiguities $n_{25(i)/34/35(m)}$ requires large angle rotation of the antennas 35(1)–(3) about at least one of the axis of the local horizontal coordinate system 46, as described in Cohen and Parkinson, "Aircraft Applications of GPS-Based Attitude Determination: Test Flights on a Piper Dakota", ION GPS-92, Albuquerque, N. Mex., September 1992, which is hereby expressly incorporated by reference herein. FIG. 5 shows the vector relationships for such a rotation.

In FIG. 5, antennas 35(1)–(3) rotate about the altitude AL axis. This may take place in space, in the air, or the ground at runway 23. The baseline vectors $b_{35(1)}$, $b_{35(2)}$, and $b_{35(3)}$ are unknown at the initial epoch of the initialization process. The vectors $\Delta b_{35(1)}$, $\Delta b_{35(2)}$, and $\Delta b_{35(3)}$ respectively represent the change in positions of the antennas 35(1)–(3) at a second epoch with respect to the initial baseline vectors $b_{35(1)}$, $b_{35(2)}$, and $b_{35(3)}$. The vector $\Delta b_{35(m)}$ (i.e. the $m^{th}$ of the vectors $\Delta b_{35(1)}$, $\Delta b_{35(2)}$, and $\Delta b_{35(3)}$) is provided as follows in Equation (8):

$$\Delta b_{35(m)} = \begin{bmatrix} \Delta b_{35(m)/AT} \\ \Delta b_{35(m)/CT} \\ \Delta b_{35(m)/AL} \end{bmatrix} \qquad (8)$$

where $\Delta b_{35(m)/AT}$, $\Delta b_{35(m)/CT}$, and $\Delta b_{35(m)/AL}$ are respectively the change in position of the antenna 35(m) at the second epoch in the along track AT, cross track CT, and altitude AL directions.

The equations generated from Equation (8) at the initial and the second epoch can be subtracted to establish the following relationship in Equation (9):

$$\Delta \Phi_{25(i)/34/35(m)} = \hat{s}_{24(i)}{}^T \Delta b_{35(m)} \qquad (9)$$

where $\Delta \Phi_{25(i)/34/35(m)}$ represents the change in $\Phi_{25(i)/34/35(m)}$ between the initial epoch and the second epoch.

The equations generated from Equation (9) may be stacked at a number of epochs after the initial epoch to solve for the vectors $\Delta b_{35(m)}$. Thus, the vectors $\Delta b_{35(m)}$ may be simultaneously computed at each of these epochs without resolving the integer ambiguities $n_{25(i)/34/35(m)}$.

The antennas 35(1)–(3) are fixed to the airplane (or spacecraft) 21. Thus, the following constraint relationship may be imposed on the baseline vectors $b_{35(y)}$ and $b_{35(z)}$ (i.e. the $y^{th}$ and $z^{th}$ of the vectors $b_{35(1)}$–$b_{35(3)}$) as follows in Equation (10):

$$(b_{35(y)} + \Delta b_{35(y)})(b_{35(z)} + \Delta b_{35(z)}) = b_{35(y)}{}^T b_{35(z)} \qquad (10)$$

However Equation (10) can also be mathematically expressed as follows in equation (11):

$$(b_{35(y)} + \Delta b_{35(y)})(b_{35(z)} + \Delta b_{35(z)}) = b_{35(y)}{}^T b_{35(z)} + \Delta b_{35(z)}{}^T b_{35(y)} + \Delta b_{35(y)}{}^T b_{35(z)} + \Delta b_{35(y)}{}^T \Delta b_{35(z)} \qquad (11)$$

Thus, the Equations (10) and (11) can be combined to form the following relationship in Equation (12):

$$\Delta b_{35(z)}{}^T b_{35(y)} + \Delta b_{35(y)}{}^T b_{35(z)} = -\Delta b_{35(y)}{}^T \Delta b_{35(z)} \qquad (12)$$

Equation (12) can be stacked by receiver 33 in matrix form to provide equations at each epoch after the initial epoch for solving the unknown vectors $b_{35(m)}$. This includes the situations where y≠z and where y=z.

For greater accuracy more than the minimum number of epochs needed to calculate the baseline vectors $b_{35(m)}$ should be employed by receiver 33. As a result, receiver 33 can generate additional equations from Equation (12) for simultaneously solving the over-determined set of unknown baseline values.

Once these baseline values are computed, receiver 33 then computes the integer ambiguities. This is done in the following manner.

The issue of the flexibility of airplane (or spacecraft) 21 must be first taken into account for computing the integer ambiguities $n_{25(i)/34/35(m)}$. Specifically, the difference in relative position of antennas 35(1)–(3) with respect to antenna 34 due to wing flexure can amount to a significant fraction of a wavelength. It is important to relate the flexure of airplane (or spacecraft) 21 to (A) the known position vectors $k_{0/35(1)}$, $k_{0/35(2)}$, and $k_{0/35(3)}$ for the antennas 35(1)–(3) in the absence of flexure, (B) the integer ambiguities $n_{25(i)/34/35(m)}$, and (C) the phase values $\Phi_{25(i)/34}$ and $\Phi_{25(i)/35(m)}$ measured for each of the GPS signals at each epoch.

FIG. 6 shows the vector relationships associated with antennas 35(1)–(3) in a body coordinate system 47 defined by the airplane (or spacecraft) 21 and the coordinate axes X, Y, and Z. The known position vectors $k_{0/35(1)}$, $k_{0/35(2)}$, and $k_{0/35(3)}$ in the body coordinate system 47 are precisely surveyed in the absence of flexure. The known vector $k_{0/35(m)}$ [3×1] (i.e. the $m^{th}$ of the known vectors $k_{0/35(1)}$, $k_{0/35(2)}$, and $k_{0/35(3)}$) is provided as follows in Equation (13):

$$k_{0/35(m)} = \begin{bmatrix} k_{0/35(m)/X} \\ k_{0/35(m)/Y} \\ k_{0/35(m)/Z} \end{bmatrix} \qquad (13)$$

where $k_{0/35(m)/X}$, $k_{0/35(m)/Y}$, and $k_{0/35(m)/Z}$ are respectively the known distances between antennas 35(m) and 34 in the X, Y, and Z directions.

The relationship of each known position vector $k_{0/35(m)}$ to flexure of airplane (or spacecraft) 21 is given as follows in Equation (14):

$$k_{35(m)} = k_{0/35(m)} + k_{flex/35(m)} \delta f \qquad (14)$$

where (A) $k_{35(m)}$ is the estimate for the position of antenna 35($m$) during flexure of airplane (or spacecraft) 21, (B) $k_{flex/35(m)}$ is the $m^{th}$ of the flexure vectors $k_{flex/35(1)}$, $k_{flex/35(2)}$, and $k_{flex/35(3)}$ and is associated with antenna 35($m$), and (C) $\delta f$ is the state of flexure of airplane (or spacecraft) 21 during the initialization process.

The flexure vectors $k_{flex/35(1)}$, $k_{flex/35(2)}$, and $k_{flex/35(3)}$ respectively associated with antennas 35(1)–(3) are given as follows in Equations (15)–(17):

$$k_{flex/35(1)} = \begin{bmatrix} 0 \\ 0 \\ -1 \end{bmatrix} \qquad (15)$$

$$k_{flex/35(2)} = \begin{bmatrix} 0 \\ 0 \\ -1 \end{bmatrix} \qquad (16)$$

$$k_{flex/35(3)} = \begin{bmatrix} 0 \\ 0 \\ 0 \end{bmatrix} \qquad (17)$$

FIG. 7 shows the vector relationships associated with antennas 35(1)–(3) as the body coordinate system 47 rotates about the local horizontal coordinate system 46. The unknown vectors $x_{35(1)}$, $x_{35(2)}$, and $x_{35(3)}$ respectively represent the unknown positions of attitude antennas 35(1), 35(2), and 35(3) from antenna 34 with respect to the local horizontal coordinate system 46. The unknown vector $x_{35(m)}$ [3×1] (i.e. the $m^{th}$ of the unknown vectors $x_{35(1)}$, $x_{35(2)}$, and $x_{35(3)}$) is provided as follows in Equation (18):

$$x_{35(m)} = \begin{bmatrix} x_{35(m)/AT} \\ x_{35(m)/CT} \\ x_{35(m)/AL} \end{bmatrix} \qquad (18)$$

where $x_{35(m)/AT}$, $x_{35(m)/CT}$, and $x_{35(m)/AL}$ are respectively the unknown distances between antennas 35($m$) and 34 in the along track AT, cross track CT, and altitude AL directions.

From the preceding vector relationships shown in FIG. 7 and developed in Equations (5) and (18), the following relationship is provided in Equation (19):

$$\Delta r_{24(i)/34/35(m)} = \hat{s}^T_{24(i)} x_{35(m)} \qquad (19)$$

Combining Equations (19) and (3) results in the following relationship in Equation (20):

$$\Phi_{25(i)/34/35(m)} = \hat{s}^T_{24(i)} x_{35(m)} - n_{25(i)/34/35(m)} \qquad (20)$$

Furthermore, the attitude matrix A represents the estimate of the attitude of the airplane (or spacecraft) 21 at a particular epoch. The matrix A is established from the rotation of the body coordinate system 47 of airplane (or spacecraft) 21 with respect to the local horizontal coordinate system 46 at the epoch. The transpose of this matrix is provided as follows in Equation (21):

$$A^T = \begin{bmatrix} A_{X/AT} & A_{Y/AT} & A_{Z/AT} \\ A_{X/CT} & A_{Y/CT} & A_{Z/CT} \\ A_{X/AL} & A_{Y/AL} & A_{Z/AL} \end{bmatrix} \qquad (21)$$

where each element of the matrix represents the rotation of a coordinate of the body coordinate system 47 with respect to a coordinate of the local horizontal coordinate system 46 at the measurement epoch.

The following relationship may then be established in Equation (22):

$$x_{35(m)} = A^T k_{35(m)} \qquad (22)$$

As a result, the vector $A^T k_{35(m)}$ represents the position of antenna 35($m$) relative to antenna 34 in the local horizontal coordinate system 46. Therefore, combining equation (19) with Equation (20) results in the following relationship provided by Equation (23):

$$\Phi_{25(i)/34/35(m)} = \hat{s}^T_{24(i)} A^T k_{35(m)} - n_{25(i)/34/35(m)} \qquad (23)$$

Furthermore, the attitude matrix A may be expressed as follows in Equation (22):

$$A = \delta A A_0 \qquad (22)$$

where (A) $\delta A$ [3×3] is an attitude correction matrix of small angle rotations, and (B) $A_0$ is the estimate for A from the previous iteration. The correction matrix $\delta A$ is expressed as follows in Equation (23):

$$\delta A = I + \Theta^x \qquad (23)$$

where (A) I [3×3] is an identity matrix, and (B) $\Theta^x$ [3×3] is the skew symmetric matrix at each measurement epoch associated with the unknown vector $\delta\Theta$ of small angle rotations at the same epoch.

The unknown vector $\delta\Theta$ [3×1] can be expressed as follows in Equation (24):

$$\delta\Theta = \begin{bmatrix} \delta\theta_X \\ \delta\theta_Y \\ \delta\theta_Z \end{bmatrix} \qquad (24)$$

where $\delta\Theta_x$, $\delta\Theta_y$, and $\delta\Theta_z$ respectively represent the unknown small angle rotations about the X, Y, and Z coordinates of the body coordinate system 47.

The skew symmetric matrix $\Theta^x$ associated with the vector $\delta\Theta$ can be expressed as follows in Equation (25):

$$\Theta^x = \begin{bmatrix} 0 & -\delta\theta_Z & \delta\theta_Y \\ \delta\theta_Z & 0 & -\delta\theta_X \\ -\delta\theta_Y & \delta\theta_X & 0 \end{bmatrix} \qquad (25)$$

Combining Equations (14), (22), (23), with Equation (21) results in Equation (26):

$$k_{0/35(m)}^T \Theta^x A_0 \hat{s}_{24(i)} + k_{flex/35(m)}^T A_0 \hat{s}_{24(i)} \delta f + k_{flex/35(m)}^T \Theta^x A_0 \hat{s}_{24(i)} \delta f - n_{25(i)/34/35(m)} = \Phi_{25(i)/34/35(m)} - k_{0/35(m)}^T A_0 \hat{s}_{24(i)} \qquad (26)$$

However, the product of $\Theta^x$ and $\delta f$ is assumed small and therefore the term $k_{flex/35(m)}^T \Theta^x A_0 \hat{s}_{24(i)} \delta f$ can be neglected in Equation (26). Furthermore, the dot product of the matrix $\Theta^x$ and the vector $k_{0/35(m)}$ can be expressed as the dot product of the matrix $K_{0/35(m)}^x$ and the vector $\delta\Theta$ where the matrix $K_{0/35(m)}^x$ is represented as follows in Equation (27):

$$K_{0/35(m)}^x = \begin{bmatrix} 0 & -k_{0/35(m)/AT} & k_{0/35(m)/AT} \\ k_{0/35(m)/CT} & 0 & -k_{0/35(m)/CT} \\ -k_{0/35(m)/A} & k_{0/35(m)/A} & 0 \end{bmatrix} \qquad (27)$$

Thus, Equation (26) may be rewritten as follows in Equation (28):

$$\hat{s}_{24(i)}^T A_0 K_{0/35(m)}^x \delta\Theta + k_{flex/35(m)}^T A_0 \hat{s}_{24(i)} \delta f - n_{25(i)/34/35(m)} = \Phi_{25(i)/34/35(m)} - k_{0/35(m)}^T A_0 \hat{s}_{24(i)} \qquad (28)$$

Note that Equation (28) does not require or assume that airplane (or spacecraft) 21 is rotating at a constant rate of rotation during the initialization period. Thus, this equation may be applied to the situation when airplane (or spacecraft) 21 is rotating at a constant rate of rotation and to the situation when it is not rotating at a constant rate of rotation.

Equation (28) can then be stacked over the N measurement epochs of the initialization period so as to from the following set of simultaneous Equations defined by the matrix system (29):

$$\begin{bmatrix} H^{(1)} & 0 & \ldots & \ldots & 0 & | & f^{(1)} & | & I \\ 0 & \ddots & & & \vdots & | & \vdots & | & \vdots \\ \vdots & & H^{(q)} & & \vdots & | & f^{(q)} & | & I \\ \vdots & & & \ddots & 0 & | & \vdots & | & \vdots \\ 0 & \ldots & \ldots & 0 & H^{(N)} & | & f^{(N)} & | & I \end{bmatrix} \begin{bmatrix} \delta\theta^{(1)} \\ \vdots \\ \delta\theta^{(q)} \\ \vdots \\ \delta\theta^{(N)} \\ \delta f \\ n \end{bmatrix} = \begin{bmatrix} \delta\psi^{(1)} \\ \vdots \\ \delta\psi^{(q)} \\ \vdots \\ \delta\psi^{(N)} \end{bmatrix} \quad (29)$$

where (A) each small angle rotation vector $\delta\Theta^{(q)}$ is the small angle rotation vector at the $q^{th}$ of the N epochs, (B) the vector n comprises the integer ambiguities $n_{25(i)/34/35(m)}$, and (C) the I matrices are identity matrices. Furthermore, the vector $\delta\psi^{(q)}$ in Equation (29) is the vector of differential phase residuals at the $q^{th}$ of the N measurement epochs and is given by Equation (30):

$$\delta\psi^{(q)} = [\Phi^{(q)}_{25(i)/34/35(m)} - k^T_{0/35(m)} A_0^{(q)} \hat{s}_{24(i)}] \quad (30)$$

where each differential phase measurement $\Phi_{25(i)/34/35(m)}^{(q)}$ is the differential phase at the $q^{th}$ of the N measurement epochs. The matrix $H^{(q)}$ (i.e. the $q^{th}$ of the matrices $H^{(1)}$ through $H^{(N)}$) in Equation (29) is the sensitivity matrix of changes in measured differential phase $\Phi_{25(i)/34/35(m)}^{(q)}$ with respect to the small angle rotations $\delta\Theta^{(q)}$ at the $q^{th}$ of the N measurement epochs and is given by Equation (31):

$$H^{(q)} = [\hat{s}^T_{24(i)} A_0^{(q)T} K^x_{0/35(m)}] \quad (31)$$

where the matrix $A_0^{(q)}$ is the attitude matrix at the $q^{th}$ of the N measurement epochs of the initialization period. The vector $f^{(q)}$ in Equation (29) is the flexure sensitivity vector of changes in differential phase $\Phi_{25(i)/34/35(m)}^{(q)}$ with respect to the flexure state value $\delta f$ at the $q^{th}$ of the N measurement epochs and is given by Equation (32):

$$f^{(q)} = [k^T_{flex/35(m)} A_0^{(q)} \hat{s}_{24(i)}] \quad (32)$$

The vector of unknowns $\delta\Theta^{(q)}$, $\delta f$, and n can be iteratively solved using the matrix system (29). However, this matrix system may be overwhelming for the computing power of GPS attitude receiver 33. For example, considering a scenario with 6 of the GPS signals 25(1)–(j) received by each of the antennas 35(1)–(3), each of the matrices $H^{(q)}$ will be 18×3. Combining together perhaps 60 phase measurements (i.e. N=60) $\Phi_{25(i)/34}$ and $\Phi_{25(i)/35(m)}$ over a thirty second span, the total size of the system is 1080×199. The resulting storage is approximately 1 MB of RAM.

However, the sparsity of the coefficient matrix for the left side of the set of Equations (29) can be taken advantage of in solving for the vector of unknowns $\delta\Theta^{(q)}$, $\delta f$ and n with a minimum of storage space. This can be done with block Cholesky decomposition as described in Golub and van Loan, "Matrix Computations", 2nd Ed., Johns Hopkins University Press, Baltimore, Md., 1989, pp. 141–145, which is hereby expressly incorporated by reference herein.

An especially efficient method of implementing the block Cholesky decomposition is provided next. This first requires re-constructing the set of Equations defined by the matrix system (29) as follows in the symmetric matrix system (33):

$$\begin{bmatrix} H^{(1)T}H^{(1)} & 0 & \ldots & \ldots & 0 & | & \overline{H}^{(1)T} \\ 0 & \ddots & & & \vdots & | & \vdots \\ \vdots & & H^{(q)T}H^{(q)} & & \vdots & | & \overline{H}^{(q)T} \\ \vdots & & & \ddots & 0 & | & \vdots \\ 0 & \ldots & \ldots & 0 & H^{(N)T}H^{(N)} & | & \overline{H}^{(N)T} \\ \hline \overline{H}^{(1)} & \ldots & \overline{H}^{(q)} & \ldots & \overline{H}^{(N)} & | & \overline{I} \end{bmatrix} \begin{bmatrix} \delta\theta^{(1)} \\ \vdots \\ \delta\theta^{(q)} \\ \vdots \\ \delta\theta^{(N)} \\ \hline \delta f \\ n \end{bmatrix} = \begin{bmatrix} \overline{\psi}^{(1)} \\ \vdots \\ \overline{\psi}^{(q)} \\ \vdots \\ \overline{\psi}^{(N)} \\ \hline \overline{\psi}_n \end{bmatrix} \quad (33)$$

where (A) the $q^{th}$ of the matrices $\overline{H}^{(1)}$ through $\overline{H}^{(N)}$ is given as follows in Equation (34):

$$\overline{H}^{(q)} = \left[ \frac{f^{(q)T}H^{(q)}}{H^{(q)}} \right] \quad (34)$$

(B) the matrix $\overline{I}$ is given as follows in Equation (35):

$$\overline{I} = \begin{bmatrix} \sum_{q=1}^{N} f^{(q)T}f^{(q)} & | & \sum_{q=1}^{N} f^{(q)T} \\ \sum_{q=1}^{N} f^{(q)} & | & NI \end{bmatrix} \quad (35)$$

(C) the $q^{th}$ of the vectors $\overline{\psi}^{(1)}$ through $\overline{\psi}^{(1)}$ is given as follows in Equation (36):

$$\overline{\psi}^{(q)} = H^{(q)T}\delta\psi^{(q)} \quad (36)$$

(D) the vector $\overline{\psi}_n$ is given as follows in Equation (37):

$$\overline{\psi}_n = \begin{bmatrix} \sum_{q=1}^{N} f^{(q)T}\delta\psi^{(q)} \\ \sum_{q=1}^{N} \delta\psi^{(q)} \end{bmatrix}$$

and (E) the vector $\overline{n}$ is given as follows in Equation (38):

$$\overline{n} = \begin{bmatrix} \delta f \\ n \end{bmatrix} \quad (38)$$

For convenience, the matrix system (33) can be described in short hand notation in the following matrix system (39):

$$Hx = \psi \quad (39)$$

where (A) the coefficient matrix H on the lefthand side is the large symmetric sensitivity matrix, (B) the column vector $\psi$ on the righthand side is the large differential phase residual vector, and (C) the solution vector x is the large vector of unknowns.

Receiver 33 performs block Cholesky factorization of the symmetric matrix H of the matrix system (39) so as to define the following symmetric matrix system (40):

$$LL^T x = \psi \qquad (40)$$

where $LL^T$ equals the matrix H. The symmetric matrix L is given as follows in Equation (41):

$$L = \begin{bmatrix} L^{(1)} & 0 & \cdots & \cdots & 0 & | & 0 \\ 0 & \ddots & & & \vdots & | & \vdots \\ \vdots & & \ddots & & \vdots & | & \vdots \\ \vdots & & & L^{(q)} & & | & \vdots \\ \vdots & & & & \vdots & | & \vdots \\ \vdots & & & & 0 & | & \vdots \\ 0 & \cdots & \cdots & 0 & L^{(N)} & | & 0 \\ G^{(1)} & \cdots & G^{(q)} & \cdots & G^{(N)} & | & L_n \end{bmatrix} \qquad (41)$$

where (A) $L^{(q)}$ is the $q^{th}$ of the individual matrices $L^{(1)}$ through $L^{(N)}$ and is given as follows in Equation (42):

$$L^{(q)} = \sqrt{H^{(q)T} H^{(q)}} \qquad (42)$$

(B) the $q^{th}$ of the matrices $G^{(q)}$ through $G^{(N)}$ is given as follows in Equation (43):

$$G^{(q)T} = L^{(q)-1} \overline{H}^{(q)T} \qquad (43)$$

and (C) the matrix $L_n$ is given as follows in Equation (44):

$$L_n = \sqrt{\overline{I} - \sum_{q=1}^{N} G^{(q)} G^{(q)T}} \qquad (44)$$

Then receiver 33 utilizes Cholesky block back substitution for computing the vector x in matrix system (40). This is done by receiver 33 by first solving for the vector y given in the following relationship (45):

$$y = L^{-1} \psi \qquad (45)$$

where (A) $y = L^T x$. The vector y is expressed as follows in Equation (46):

$$y = \begin{bmatrix} y^{(1)} \\ \vdots \\ y^{(q)} \\ \vdots \\ y^{(N)} \\ \hline y_n \end{bmatrix} \qquad (46)$$

where (A) $y^{(q)}$ is given as follows in Equation (47):

$$y^{(q)} = L^{(q)-1} \overline{\psi}^{(q)} \qquad (47)$$

and (B) $y_n$ is given as follows in Equation (48):

$$y_n = L_n^{-1} \left( \overline{\psi}_n - \sum_{q=1}^{N} G^{(q)} \overline{\psi}^{(q)} \right) \qquad (48)$$

Once the vector y in the matrix system (45) has been computed by receiver 33, then the vector x of unknowns can be solved for with the following relationship in Equation (49):

$$x = L^{-T} y \qquad (49)$$

where (A) the vector $\delta\Theta^{(q)}$ included in the vector x is given as follows in Equation (50):

$$\delta\Theta^{(q)} = L^{(q)-T}(y^{(q)} - G^{(q)T}\overline{n}) \qquad (50)$$

(B) the vector $\overline{n}$ included in the vector x is given as follows in Equation (51):

$$\overline{n} = L_n^{-T} y_n \qquad (51)$$

Then, the vectors $\delta\Theta^{(q)}$ of small angle rotations and the integer ambiguities $n_{25(i)/34/35(m)}$ can be obtained through Equation (38). Thus, through block Cholesky decomposition, the vectors $\delta\Theta^{(q)}$ of small angle rotations, the integer ambiguities $n_{25(i)/34/35(m)}$, and the flexure state value $\delta f$ can all be solved for by receiver 33.

However, in order to iteratively compute the vector n, an initial estimate for the attitude matrix $A_0^{(q)}$ at each of the N measurement epochs of the initialization period must be computed so that initial estimates for the matrices $H^{(q)}$ and the vectors $f^{(q)}$ and $\psi^{(q)}$ can be determined. This is done in the manner described in Cohen, Cobb, and Parkinson, "Two studies of High Performance Attitude Determination Using GPS: Generalizing Wahba's Problem for High Output Rates and Evaluation of Static Accuracy Using Theodolite", ION GPS-92, September 1992, and in Markley, "Attitude Determination using Vector Observations and the Singular Value Decomposition", Journal of the Astronautical Sciences, Vol. 36, No. 3, July–September 1988, pp. 245–258, both of which are hereby expressly incorporated by reference herein.

Receiver 33 does this by first computing the positions of the antennas 35(1)–(3) with respect to antenna 34 in the local horizontal coordinate system 46 at each of the N measurement epochs of the initialization period. Thus, the position for the $m^{th}$ of the antennas 35(1)–(3) at the $q^{th}$ measurement epoch can be given by the relationship in Equation (52):

$$b_{35(m)}^{(q)} = b_{0/35(m)} + \Delta b_{35(m)}^{(q)} \qquad (52)$$

where (A) $\Delta b_{35(m)}^{(q)}$ is the $q^{th}$ position change vector for $m^{th}$ of the antennas 35(1)–(3) computed from the stacked set of equations generated from Equation (9) at each epoch of the N epochs as described earlier, and (B) $b_{0/35(m)}$ is computed from the stacked set of equations generated from Equation (12) as described earlier Then receiver 33 can compute an intermediate matrix at each of the N measurement epochs of the initialization period so that the intermediate matrix $D^{(q)}$ for the $q^{th}$ of the measurement epochs is described as follows in Equation (53):

$$D^{(q)} = K B^{(q)T} \qquad (53)$$

where (A) the matrix K is given as follows in Equation (54)

$$K = [k_{35(1)} k_{35(2)} k_{35(3)}] \qquad (54)$$

and (B) the matrix $B^{(q)}$ is given as follows in Equation (55):

$$B^{(q)}=[b_{(35(1)}{}^{(q)}b_{(35(2)}{}^{(q)}b_{35(3)}{}^{(q)}] \quad (55)$$

Receiver 33 then performs the singular value decomposition (SVD) of each of the matrices $D^{(q)}$ to generate the orthonormal matrices $U^{(q)}{}_D$ and $V^{(q)}{}_D$ in accordance with the following relationship in Equation (56):

$$D^{(q)} = U_D^{(q)} \Sigma_D^{(q)} V_D^{(q)} \quad (56)$$

where (A) $U^{(q)}{}_D$ and $V^{(q)}{}_D$ are the orthonormal matrices at the $q^{th}$ of the N epochs, and (B)

$$\Sigma_D^{(q)}$$

is a diagonal matrix of positive singular values at the $q^{th}$ of the N epochs.

The signs of the third column (associated with the smallest singular value) of both orthonormal matrices $U^{(q)}{}_G$ and $V^{(q)}{}_G$ are adjusted by receiver 33 to yield the proper matrices $U^{(q)}{}_+$ and $V^{(q)}{}_+$. The optimal attitude matrix $A^{(q)}{}_0$ at the $q^{th}$ measurement epoch is then computed by receiver 33 from the following relationship in Equation (57):

$$A^{(q)}{}_0 = U^{(q)}{}_+ V^{(q)T}{}_+ \quad (57)$$

Once the very first initial guess for the attitude matrix $A^{(q)}{}_0$ is computed, the vector n is iteratively computed by taking the vectors of small angle rotation $\delta\Theta^{(q)}$ computed from the current iteration and substituting them into the Equation 25 to form the skew matrices $\Theta^{x(q)}$. The computed matrices $\Theta^{x(q)}$ are then substituted into the Equation (23) to form the attitude correction vectors $\delta A^{(q)}$. Then, the current estimate for the attitude matrices $A_0^{(q)}$ is computed and squared off in accordance with Equation (22). These estimates are then substituted back into the matrix system (33) for computation of the next estimate of the vector n. This is repeated until the computed values which represent the unknown vectors $\delta\Theta^{(q)}$, the integer ambiguities $n_{25(i)/34/35(m)}$, and the flexure state value $\delta f$ converge. Thus, the iteratively computed values for the integer ambiguities $n_{25(i)/34/35(m)}$ represent resolution of the integer ambiguities. As was indicated earlier, these integer ambiguities $n_{25(i)/34/35(m)}$ can be computed for when airplane (or spacecraft) 21 is at a constant rate of rotation and for when it is not at a constant rate of rotation because of the way in which Equation (28) is derived.

Once the integer ambiguities $n_{25(i)/34/35(m)}$ have been resolved, the initialization process is over and attitude solutions for airplane (or spacecraft) 21 (i.e., the attitude matrix A at each epoch after the initialization period) can then be computed.

A complete attitude solution can be generated by receiver 33 at each epoch after the initialization period by utilizing the differential ranges $\Delta r_{24(i)/34/35(m)}$ which can be computed from Equation (3). This is done by minimizing the following quadratic cost function provided in Equation (58):

$$J = \sum_{m=1}^{l} \sum_{i=1}^{j} w_{35(m)/24(i)} (\Delta r_{24(i)/34/35(m)} - k_{35(m)}^T A \hat{s}_{24(i)})^2 \quad (58)$$

where $w_{35(m)/24(i)}$ represent the optional measurement weighting associated with antenna 35(m) and GPS satellite 24(i). Equation (53) is derived similarly to Equation (21).

Starting with an assumed estimate $A_0$ for the attitude matrix A for the current attitude matrix A and an assumed estimate $\delta f_0$ for the current flexure state value, a better estimate for the current attitude matrix A may be obtained by linearizing Equation (58) about the estimates $A_0$ and $\delta f_0$ as follows in Equation (59):

$$J = \sum_{m=1}^{l} \sum_{i=1}^{j} w_{35(m)/24(i)} (\Delta r_{24(i)/34/35(m)} - \quad (59)$$

$$(k_{0/35(m)}^T + k_{flex/35(m)}(\delta f_0 + \delta\delta f)) \delta A A_0 \hat{s}_{24(i)})^2$$

where (A) the estimate $A_0$ is the attitude matrix A computed at the previous measurement epoch, (B) the estimate $\delta f_0$ is the flexure state value $\delta f$ computed for the previous epoch, and (C) $\delta\delta f$ is the flexure state correction value computed at each epoch. The relationship of $\delta f$, $\delta f_0$, and $\delta\delta f$ is given as follows in Equation (60):

$$\delta f = \delta f_0 + \delta\delta f \quad (60)$$

After combining Equations (22)–(24) and (60) with Equation (59) (in a similar way to which Equations (22)–(24) were combined with Equation (21) to produce Equation (28)), the attitude cost function can be expressed as follows in Equation (61):

$$J = \sum_{m=1}^{l} \sum_{i=1}^{j} w_{35(m)/24(i)} (\delta r_{24(i)/34/35(m)} - \quad (61)$$

$$k_{flex/35(m)}^T A_0 \hat{s}_{24(i)} \delta\delta f - \hat{s}_{24(i)} A_0^T \overline{K}_{35(m)}^x \delta\theta)^2$$

(B) the skew matrix $\overline{K}_{35(m)}{}^x$ is given as follows in Equation (63):

$$\overline{K}_{35(m)}^x = \begin{bmatrix} 0 & -\overline{k}_{35(m)/AT} & \overline{k}_{35(m)/AT} \\ \overline{k}_{35(m)/CT} & 0 & -\overline{k}_{(35(m)/CT} \\ -\overline{k}_{35(m)/A} & \overline{k}_{35(m)/A} & 0 \end{bmatrix} \quad (63)$$

and (C) the vector $\delta r_{24(i)/34/35(m)}$ at the current epoch is given in Equation (64):

$$\delta r_{24(i)/34/35(m)} = \Delta r_{24(i)/34/35(m)} - \overline{k}_{35(m)} A_0 \hat{s}_{24(i)} \quad (64)$$

The linearized cost function can now be written as a matrix system (65):

$$J(\delta\theta, \delta\delta f) \bigg|_{\delta f_0}^{A_0} = \left\| W^{1/2} \left( H \begin{bmatrix} \delta\theta \\ \delta\delta f \end{bmatrix} - \delta r \right) \right\|_2^2 \quad (65)$$

where (A) $W^{1/2}$ is a diagonal matrix formed by the square root of each weighting factor $w_{35(m)/24(i)}$ and in the preferred embodiment is an identity matrix, (B) the matrix H is the sensitivity matrix at the current epoch and is given by Equation (66):

$$H = \begin{bmatrix} \cdot & \cdot & \cdot \\ \cdot & \cdot & \cdot \\ \hat{s}_{24(2)}^T & A_0^T & \overline{K}_{35(m)}^x & \hat{s}_{24(i)}^T & A_0^T & k_{flex/35(m)} \\ \cdot & \cdot & \cdot \\ \cdot & \cdot & \cdot \end{bmatrix}$$

By minimizing the matrix system (65), the correction vector $\delta\Theta$ and the flexure state correction value $\delta\delta f$ may be iteratively computed by receiver 33 after a new set of phase measurements $\Phi_{25(i)/34}$ and $\Phi_{25(i)/35(m)}$ have been made for a given epoch. As a result, the matrix $\Theta^x$ may be computed from Equation (25) and the matrix $\delta A$ may then be computed from Equation (23). Using the computed matrix $\delta A$ and the computed matrix $A_0$, receiver 33 computes a more accurate estimate for matrix A from Equation (22). Furthermore, $\delta f$ is computed using Equation (60). The estimates A and $\delta f$ from the previous iteration are used as the current solutions $A_0$ and $\delta f_0$ for the next iteration.

The new estimates for A and δf are then computed and compared with the estimates from the previous iteration. This process is continued until the estimates for A and δf at the measurement epoch converges to within a desired level.

Thus, a flexure state value δf is computed at each epoch after the initialization period. This is different from the initialization process where the flexure state value δf is assumed constant over the initialization period.

The matrix A and the computed flexure state value δf just computed are then used as the initial guesses $A_0$ and $\delta f_0$ for the next epoch. Then, the iterative process described above is repeated to obtain the attitude matrix A and flexure state value δf for this epoch.

Another significant advantage to this approach is that the integer ambiguities $n_{25(i)/34/35(m)}$ of an additional GPS signal $25(i)$ broadcast by GPS satellite $24(i)$ which was not in view during the initialization period can be resolved once it does become in view after the initialization period. Receiver 33 accomplishes this by measuring $\Phi_{25(i)/34}$ and $\Phi_{25(i)/35(m)}$ for the new GPS signal $25(i)$ at a particular epoch after the initialization period. At this epoch the matrix A has already been determined by receiver 33 from the other GPS signals $25(1)-(j)$ which have had their respective integer ambiguities $n_{25(i)/34/35(m)}$ resolved during the initialization period. The calculated attitude matrix A and the phase measurements $\Phi_{25(i)/34}$ and $\Phi_{25(i)/35(m)}$ are plugged into Equation (20) so as to solve for the rounded off new integer ambiguity $n_{25(i)/34/35(m)}$. Then, this newly computed integer ambiguity $n_{25(i)/34/35(m)}$ together with the phase measurements for the newly acquired GPS signal $25(i)$ may be used in computing the matrix A in the way just described. Thus, this technique results in a seamless integer hand-off so that a new initialization period is unnecessary.

Also, due to shadowing or masking of one of the antennas 34 or $35(1)-(3)$, receiver 33 will occasionally produce an error in its carrier phase tracking which results in an integer (or cycle) slip. An integer slip is a miscount in the integer or multiple integer change of the integer wavelength portion $\Phi_{int}$ between successive phase measurements $\Phi_{25(i)/34}$ or $\Phi_{25(i)/35(m)}$ for the carrier component of a GPS signal $25(i)$ at one of the antennas 34, $35(1)$, $35(2)$, or $35(3)$. In other words, the change in the integer portion $\Phi_{int}$ is not the actual integer change in range between these successive phase measurements. As a result of an integer slip, the integer portion $\Phi_{int}$ of all of the succeeding phase measurements $\Phi_{25(i)/34}$ or $\Phi_{25(i)/35(m)}$ for the carrier component of the GPS signal $25(i)$ received by the same antenna 34, $35(1)$, $35(2)$, or $35(3)$ will then be in error by the integer amount of the integer slip.

Since the phase measurements $\Phi_{25(i)/34}$ or $\Phi_{25(i)/35(m)}$ for the GPS signal $25(i)$ at this antenna 34, $35(1)$, $35(2)$, or $35(3)$ will be in error, the computed attitude matrix A at each epoch will then also be in error. In order to correct such a problem, receiver 33 will calculate a new integer ambiguity resolution value $n_{25(i)/34/35(m)}$ which is associated with the particular phase measurements $\Phi_{25(i)/34}$ or $\Phi_{25(i)/35(m)}$ offset by the integer slip. This new integer ambiguity resolution value $n_{25(i)/34/35(m)}$ is computed in the same way as was described above for a GPS signal $25(i)$ that just came into view. Thus, receiver 33 calculates the new integer ambiguity resolution value $n_{25(i)/34/35(m)}$ while continuing to use the phase measurements $\Phi_{25(i)/34}$ or $\Phi_{25(i)/35(m)}$ offset by the integer slip so that the new integer ambiguity resolution value $n_{25(i)/34/35(m)}$ takes into account the integer slip amount.

Detailed Description of Attitude System and Method

FIGS. 8–13 provide a detailed illustration of the GPS attitude system 37. The functions of the components of the attitude system 37, in relation to the previously described equations, are better understood with reference to these figures.

FIG. 8 shows the attitude mobile system 37. It includes the GPS attitude receiver 33 and antennas 34 and $35(1)-(3)$.

Antennas 34 and $35(1)-(3)$ receive GPS signals $25(1)-(j)$. As was indicated earlier, the positions of antennas $35(1)-(3)$ with respect to antenna 34 are respectively given by the vectors $x_{35(1)}$, $x_{35(2)}$, and $x_{35(3)}$ in the local horizontal coordinate system 46 and given by the vectors $k_{35(1)}$, $k_{35(2)}$, and $k_{35(3)}$ in the body coordinate system 47.

GPS receiver 33 receives the GPS signals $25(1)-(j)$ from each of the antennas 34 and $35(1)-(3)$. It includes a signal receiving block 110, a signal processing block 111, a reference oscillator 115, a synthesizer 116, and a computer 117.

The signal receiving block 110 comprises four signal receiving stages $113(1)-(4)$. The signal receiving stage $113(4)$ is coupled to antenna 34 for receiving the GPS signals $25(1)-(j)$. The signal receiving stages $113(1)-(3)$ are respectively coupled to antennas $35(1)-(3)$ for also receiving the GPS signals $25(1)-(j)$. Each of the signal receiving stages $113(1)-(4)$ extracts the GPS signals $25(1)-(j)$ it receives and down converts them to an intermediate frequency for signal processing by the signal processing block 111.

The signal processing block 111 includes 4 multi-channel signal processing stages $114(1)-(4)$. The signal processing stages $114(1)-(4)$ are respectively coupled to the signal receiving stages $113(1)-(4)$. The signal processing stages $114(1)-(4)$ are also coupled to computer 117 for receiving signal processing control signals from the computer 117. Each of the signal processing stages $114(1)-(4)$ separates (i.e. demodulates) each of the down converted GPS signals $25(1)-(j)$ it receives into its carrier, PRN code, and data components.

Furthermore, with the signal processing control signals provided by the computer 117, each of the signal processing stages $114(1)-(4)$ phase locks the carrier and PRN code components of each of the GPS signals $25(1)-(j)$ it receives with the carrier and PRN code signals it generates. As a result, the signal processing stages $114(1)-(4)$ provide the computer 117 with information for making the earlier described carrier phase measurements $\Phi_{25(i)/34}$ and $\Phi_{25(i)/35(m)}$ for the GPS signals $25(1)-(j)$ received with the antennas 34 and $35(1)-(3)$ and also provides signal strength information for each of these GPS signals.

The computer 117 is coupled to the signal processing stages $114(1)-(4)$. It includes a central processing unit (CPU) 118 and a computer memory 119.

The CPU 118 receives from the signal processing block 111 the information for making the earlier described carrier phase measurements $\Phi_{25(i)/34}$ and $\Phi_{25(i)/35(m)}$ described earlier for the GPS signals $25(1)-(j)$ received with the antennas 34 and $35(1)-(3)$. Furthermore, the CPU also receives from the signal processing block 111 the demodulated data components of the GPS signal $25(1)-(j)$. In response to this, the CPU outputs attitude determinations for the airplane (or spacecraft) 21.

The computer memory 119 stores the signal processing routine 120, the carrier phase measuring routine 121, the directional vector computation routine 122, the static attitude initialization routine 123, the motion based attitude initialization routine 124, the attitude generating routine 125, and the integrity and integer ambiguity hand-off routine 126. The computer memory also stores data generated from these routines 120–126 in the data storage area 127. The CPU 118 is coupled to the computer memory 119 for receiving the routines 120–126 and the data in the data storage area 127.

The signal processing routine 120 generates the signal processing control signals for controlling the carrier and PRN code phase locking operations of the signal processing block 111. These control signals are output by the CPU 118 and received by the signal processing block 111.

The carrier phase measuring routine 121 makes the phase measurements $\Phi_{25(i)/34}$ and $\Phi_{25(i)/35(m)}$ based on the information received from the signal processing block 111. Thus, the routine 121 and the signal processing block 111 make up the carrier phase measuring component of the receiver 33. As was indicated earlier, each of these carrier phase measurements includes both a fractional wavelength phase component $\Phi_{fr}$ and an integer wavelength phase change component $\Phi_{int}$. These phase measurements are used by receiver 33 for making the Carrier Phase Differential GPS attitude determinations. As was discussed earlier, these carrier phase measurements are made by the routine 121 at the rate of approximately 1–10 Hz.

The unit directional vector computation routine 122 computes the vectors $\hat{s}_{24(i)/34}$ in the manner described earlier. Thus, these vectors are computed from (A) the satellite orbital positions received in the data components of the GPS signals 25(1)–(j), and (B) the location of reference antenna 34 in the coordinate system used to define the satellite orbital positions computed by routine 122 from Conventional GPS.

The static attitude initialization routine 123 when selected computes the initialization values $n_{25(i)/34/35(m)}$ from Equation (7) in the manner described earlier. Thus, routine 123 is responsive to (A) the measurements $\Phi_{25(i)/34}$ and $\Phi_{25(i)/35(m)}$ made by routine 122 over several epochs, and (B) the directional vectors $\hat{s}_{24(i)/34}$ computed by routine 122. Since routine 123 records these values so that Equation (43) is stacked in matrix form, the values $n_{25(i)/34/35(m)}$ can be simultaneously solved. These initialization values $n_{25(i)/34/35(m)}$ are then stored in the data storage area 127 for use by the attitude determination routine 125. As a built in integrity check, these values are checked to see that they converge to integer values.

The motion based attitude initialization routine 124 when selected computes the initialization values $n_{25(i)/34/35(m)}$ in the manner described earlier. As shown in FIG. 8, the initialization routine 124 includes a baseline vector computation subroutine 130, an initial attitude guess subroutine 131, and an integer ambiguity resolution subroutine 132. The operation and relationship of these routines to one another is shown in FIG. 9.

At step 134, subroutine 130 first computes the vectors $\Delta b_{35(m)}$ based on Equation (9) in the manner described earlier and records them in the storage area 127. Specifically, routine 130 records in data storage area 127 the measurements $\Phi_{25(i)/34}$ and $\Phi_{25(i)/35(m)}$ made by routine 121 at an initial epoch. Then, at a number of succeeding epochs routine 130 computes the vectors $\Delta b_{35(m)}$ from (A) the measurements $\Phi_{25(i)/34}$ and $\Phi_{25(i)/35(m)}$ recorded at the initial epoch and made at these succeeding epochs, and (B) the unit directional vectors $\hat{s}_{24(i)/34}$ computed by routine 122.

Then, at step 136, baseline vector computation routine 130 computes the baseline vectors $b_{35(m)}$ from Equation (12). Specifically, these values are generated from (A) measurements $\Phi_{25(i)/34}$ and $\Phi_{25(i)/35(m)}$ made by routine 121 at the epochs employed, (B) the vectors $\Delta b_{35(m)}$ computed by subroutine 130 from Equation (9) at each of the epochs employed after the initial epoch, and (C) the unit directional vectors $\hat{s}_{24(i)/34}$ computed by routine 122. Routine 130 records these values in the data storage area 127 so that Equation (12) is stacked in matrix form. As a result, the baseline vectors $b_{35(m)}$ can be simultaneously solved and stored in the data storage area 127.

At step 138, the initial attitude guess subroutine 131 first generates the N matrices $B^{(q)}$ and the matrix K according to Equations (54) and (55) in the manner described earlier. Specifically, subroutine 131 generates the N vectors $b_{35(m)}^{(1)}$ through $b_{35(m)}^{(N)}$ which form the matrix $B^{(q)}$ according to Equation (52) from (A) the baseline vectors $b_{35(m)}$ computed by subroutine 130, and (B) the N baseline change vectors $\Delta b_{35(m)}^{(1)}$ through $\Delta b_{35(m)}^{(N)}$ computed by subroutine 130.

Then, as shown in step 140, the subroutine 131 computes the N matrices $D^{(q)}$ according to Equation (53). In other words, the N matrices $D^{(q)}$ are computed from (A) the N matrices $B^{(q)}$, and (B) the matrix K.

In step 142, the subroutine 131 computes the N orthonormal matrices $U^{(q)}_D$ and the N orthonormal matrices $V^{(q)T}_D$ according to Equation (56) from the N matrices $D^{(q)}$ computed by subroutine 131 in step 140.

Then, at step 144, the subroutine flips the signs of the third column (associated with the smallest singular value) of the N orthonormal matrices $U^{(q)}_D$ and the N orthonormal matrices $V^{(q)}_D$ to yield the N proper matrices $U^{(q)}_+$ and N proper matrices $V^{(q)}_+$.

And finally, at step 146, the subroutine 131 computes the N initial guess attitude matrices $A^{(q)}_0$ according to Equation (57) from (A) the N matrices $U^{(q)}_+$, and (B) the N proper matrices $V^{(q)}_+$.

At step 148, the integer ambiguity resolution subroutine 132 first computes the N sensitivity matrices $H^{(q)}$, the N vectors $f^{(q)}$, and the N vectors $\delta\psi^{(q)}$ in accordance with the matrix system (29). Thus, the N vectors $\delta\psi^{(q)}$ are computed with Equation (30) from (A) the N phase measurements $\Phi_{25(i)/34/35(m)}^{(q)}$ for each GPS signal 25(i) received by antenna 35(m), (B) the vectors $k_{0/35(m)}$ stored in data storage area 127, (C) the N attitude matrices $A^{(q)}_0$ computed by subroutine 131 for the first iteration and, as described shortly, computed by subroutine 132 for the succeeding iterations, (D) the unit directional vectors $\hat{s}_{24(i)/34}$ computed by routine 122. The N matrices $H^{(q)}$ are computed in accordance with Equation (31) from (A) the matrices $K_{0/35(m)}^x$ stored in the data storage area 127, (B) the N attitude matrices $A^{(q)}_0$ computed by subroutine 131 for the first iteration and, as described shortly, computed by subroutine 132 for the succeeding iterations, and (C) the unit directional vectors $\hat{s}_{24(i)/34}$ computed by routine 122. The N vectors $f^{(q)}$ are computed in accordance with Equation (32) from (A) the vectors $k_{flex/35(m)}$ recorded in storage area 127, (B) the N attitude matrices $A^{(q)}_0$ computed by subroutine 131 for the first iteration and, as described shortly, computed by subroutine 132 for the succeeding iterations, and (C) the unit directional vectors $\hat{s}_{24(i)/34}$ computed by routine 122.

Then, at step 150, subroutine 132 constructs the matrix system (33). Thus, subroutine 132 constructs (A) the N matrices $\overline{H}^{(q)}$ in accordance with Equation (34), (B) the matrix $\overline{I}$ in accordance with Equation (35), (C) the N vectors $\overline{\psi}^{(q)}$ in accordance with Equation (36), and (D) the vector $\overline{\psi}_n$ in accordance with Equation (37).

In step 152, subroutine 132 performs block Cholesky factorization of matrix H in matrix system (39) to construct the matrix system (40). Thus, it computes (A) the N matrices $L^{(q)}$ in accordance with Equation (42), (B) the N matrices $G^{(q)T}$ in accordance with Equation (43), and (C) the matrix $L_n$ in accordance with Equation (44).

The subroutine 132 then performs a first round of block back Cholesky substitution in step 154 to compute the vector y in the relationship shown in Equation (45). Specifically, it computes (A) the N vectors $y^{(q)}$ according to Equation (47), and (B) the vector $Y_n$ according to Equation (48).

In step 156, subroutine 132 performs a second round of block back substitution in accordance with Equation (49) to compute the vector x of the matrix system (40). Thus, it computes (A) the N vectors $\delta\Theta^{(q)}$ according to Equation (50), and (B) the vector $\bar{n}$ according to Equation (51). The flexure state value $\delta f$ and the integer ambiguities $n_{25(i)/34/35(m)}$ are obtained from the computed vector $\bar{n}$ in accordance with Equation (38).

At step 158, subroutine 132 determines if the flexure state value $\delta f$, the integer ambiguities $n_{25(i)/34/35(m)}$, and the vectors $\delta\Theta^{(q)}$ computed from the current iteration have converged to within a desired tolerance. If so, then the initialization process is over and the computed values $n_{25(i)/34/35(m)}$ from this last iteration represent resolution of the integer ambiguities are then stored in storage area 127 and used by routine 125 at step 166. As indicated earlier, routine 125 is for computing the actual attitude determinations for airplane (or spacecraft) 21.

However, if convergence has not yet been achieved, then subroutine 132 proceeds on to step 160. At this step, subroutine 160 computes the N skew matrices $\Theta^{x(q)}$ (i.e. the $q^{th}$ of the matrices $\Theta^{x(1)}$ through $\Theta^{x(N)}$ computed for the N measurement epochs of the initialization period) according to Equation (25). The subroutine 132 then computes at step 162 the N correctional matrices $\delta A^{(q)}$ (i.e. the $q^{th}$ of the matrices $\Theta^{x(1)}$ through $\delta A^{(q)}$ computed for the N measurement epochs of the initialization period) using Equation (23).

At step 164, the subroutine 125 then computes and squares off (i.e., re-orthonormalizes) the N matrices $A_0^{(q)}$ using Equation (22). The newly computed matrices $A_0^{(q)}$ from this last iteration are then used at step 148 for the next iteration. The subroutine 164 then continues on in the way just described until it determines in step 158 that the flexure state value $\delta f$, the integer ambiguities $n_{25(i)/34/35(m)}$, and the vectors $\delta\Theta^{(q)}$ computed from the current iteration have converged. The routine 132 then generates a status report in step 165 by setting an integer valid/invalid flag for each of the integer ambiguity resolution values $n_{25(i)/34/35(m)}$ computed in step 156 which indicates that these computed values and the phase measurements $\Phi_{25(i)/34}$ and $\Phi_{25(i)/35(m)}$ which correspond to each of these values may be used for attitude computations.

Once this is done, the attitude computation routine 125 computes attitude determinations for airplane (or spacecraft) 21 at each epoch after the initialization period. The operation of the attitude determination routine 125 in conjunction with the integrity checking and integer hand off routine 126 is shown in FIG. 10.

First, at step 166, routine 125 computes at each iteration the differential phase residuals $\delta r_{24(i)/34/35(m)}$ and the sensitivity matrix H in accordance with Equations (65) and (66). Thus, the differential phase residuals $\delta r_{24(i)/34/35(m)}$ are computed from (A) the integer ambiguities $n_{25(i)/34/35(m)}$ computed by routines 123 or 124 which have been flagged as valid in step 165 of routine 132 or in step 194 of routine 126 (as described shortly, this means that these values can be used for attitude determination), (B) the measurements $\Phi_{25(i)/34}$ and $\Phi_{25(i)/35(m)}$ made by routine 121 at each epoch which are associated with the valid integer ambiguities $n_{25(i)/34/35(m)}$ and are themselves flagged as valid in step 190 (as described shortly, this means that the GPS signals 25(i) associated with these measurements have sufficient signal strength), (C) the unit directional vectors $\hat{s}_{24(i)/34}$ computed by routine 122, (D) the position vectors $\bar{k}_{35(m)}$, and (E) the attitude matrix $A_0$ computed by routine 125 from the previous iteration. Furthermore, the sensitivity matrix H is computed from (A) the unit directional vectors $\hat{s}_{24(i)/34}$ computed by routine 122, (B) the matrix $\bar{K}_{35(m)}^x$ and (C) the attitude matrix $A_0$ computed by routine 125 from the previous epoch.

Then, at step 168, the subroutine 125 computes the vector $\delta\Theta$ and the flexure state correction value $\delta\delta f$ by minimizing the linearized cost function represented by the matrix system (65). And, at step 170, the routine 125 computes the matrix $\Theta^x$ using Equation (25) and the flexure state value $\delta f$ using Equation (60). The routine 125 then computes the correctional matrix $\delta A$ using Equation (23) at step 172. At step 174, the routine 125 then computes the matrix A using Equation (22).

In step 176, subroutine 125 determines if the flexure state value $\delta f$ and the attitude matrix A computed from the current iteration have converged to within a desired tolerance. If so, then the process proceeds to step 178 of the integrity checking and integer hand off routine 126.

However, if convergence has not yet been achieved, then routine 125 returns to step 166. At this step, subroutine 125 computes the differential phase residuals $\delta r_{24(i)/34/35(m)}$ and the sensitivity matrix H in accordance with Equations (64) and (66) using the just computed attitude matrix A from the last iteration as the estimate $A_0$ for the next iteration. The routine 125 then iteratively computes the flexure state value $\delta f$ and the attitude matrix A in the way just described until it determines in step 174 that the flexure state value $\delta f$ and the attitude matrix A from the current iteration have converged to within a desired tolerance.

Once the flexure state value $\delta f$ and the attitude matrix A have converged, the integrity checking and integer handoff routine 126 determines if an integer slip has occurred. This is done as follows.

At step 178, the routine 126 computes the RMS value of the differential phase residuals $\delta r_{24(i)/34/35(m)}$ computed in step 166. In step 180, the routine 126 determines if the RMS value calculated in step 178 exceeds a predefined threshold $T_{RMS}$. If the RMS value does not exceed the threshold $T_{RMS}$, then an integer slip has not occurred and the routine 126 proceeds to step 186. However, if the RMS value exceeds the threshold $T_{RMS}$, then an integer slip is suspected and routine 126 proceeds to step 182.

At step 182, the routine 126 examines individually the absolute value of each residual $\delta r_{24(i)/34/35(m)}$ and determines which of these has the highest absolute value. For those residuals $\delta r_{24(i)/34/35(m)}$ that do exceed the threshold $T_{RES}$, the routine 126 updates in step 184 the status report by re-setting the integer valid/invalid flag for the integer ambiguity resolution value $n_{24(i)/34/35(m)}$ associated with the residual $\delta r_{24(i)/34/35(m)}$ which had the highest absolute value. The reset integer valid/invalid flag indicates that this resolution value $n_{24(i)/34/35(m)}$ and the phase measurements $\Phi_{25(i)/34}$ and $\Phi_{25(i)/35(m)}$ which correspond to it can no longer be used for attitude computations. In other words, for the phase residual $\delta r_{24(i)/34/35(m)}$ with the highest absolute value, an integer slip has occurred in the integer portion $\Phi_{int}$ of one of the phase measurements $\Phi_{25(i)/34}$ or $\Phi_{25(i)/35(m)}$ associated with that residual. Thus, the phase measurements $\Phi_{25(i)/34}$ or $\Phi_{25(i)/35(m)}$ associated with that residual cannot be used until a new integer ambiguity resolution value $n_{24(i)/34/35(m)}$ is computed which takes into account the amount of the integer slip.

In this case, the routine 125 then returns to step 166 and proceeds to compute the attitude matrix A for the next iteration. This is done without the integer ambiguity resolution values $n_{24(i)/34/35(m)}$ designated as being invalid in the status report and without the phase measurements $\Phi_{25(i)/34}$ and $\Phi_{25(i)/35(m)}$ associated with these resolution values. This process is iteratively repeated until all of the phase measurements $\Phi_{25(i)/34}$ and $\Phi_{25(i)/35(m)}$ with integer slips have been weeded out.

However, if in step 180 the RMS value of the phase residuals $\delta r_{24(i)/34/35(m)}$ does not exceed the threshold $T_{RMS}$, then an integer slip has not occurred and the routine 126 proceeds to step 186. At step 186, the routine 126 determines the signal strength of all of the GPS signals 25(1)–(j) currently in view including those that just came into view. This is done by using the signal strength information provided by the signal processing block 111.

At step 188, the routine 126 determines if the signal strength for each of the GPS signals 25(1)–(j) computed in step 186 exceeds a threshold value $T_{STR}$. If it does, then in step 190 the status report includes a phase valid/invalid flag for each of these signals which indicates that the phase measurements $\Phi_{25(i)/34}$ and $\Phi_{25(i)/35(m)}$ for each of the signals can be used by routine 125 in step 166 for later computation of the attitude matrix A and can be used by routine 126 in step 192 for computing a new integer ambiguity resolution value $n_{24(i)/34/35(m)}$. However, if the computed signal strength does not exceed the threshold $T_{STR}$, then in step 191 the phase valid/invalid flag for these signals indicates that the phase measurements $\Phi_{25(i)/34}$ and $\Phi_{25(i)/35(m)}$ cannot be used by routine 125 in step 166 nor by routine 126 in step 192.

At step 192, the routine 126 then computes a new integer ambiguity resolution value $n_{24(i)/34/35(m)}$ if (A) the integer valid/invalid flag associated with that integer ambiguity resolution value $n_{24(i)/34/35(m)}$ indicates that the currently stored value is invalid (in the case of a newly acquired GPS signal 25(i) this flag means that the integer ambiguities $n_{24(i)/34/35(m)}$ associated with that signal have not yet been resolved), and (B) the phase valid/invalid flag indicates that the phase measurements $\Phi_{25(i)/34}$ and $\Phi_{25(i)/35(m)}$ needed to compute the new integer ambiguity resolution value $n_{24(i)/34/35(m)}$ are valid (i.e. the corresponding GPS signal 25(i) has enough signal strength). This is done in accordance with Equation (20) by rounding off the result to an integer.

Thus, routine 126 computes each of these values using (A) the attitude matrix A calculated from the final iteration only with the integer ambiguity resolution values $n_{24(i)/34/35(m)}$ designated as being valid by the integer valid/invalid flags and their corresponding phase measurements $\Phi_{25(i)/34}$ and $\Phi_{25(i)/35(m)}$, and (B) the current phase measurements $\Phi_{25(i)/34}$ and $\Phi_{25(i)/35(m)}$ associated with the integer ambiguity resolution values $n_{24(i)/34/35(m)}$ that are designated as invalid by the integer valid/invalid flags (These phase measurements will have an integer wavelength portion $\Phi_{int}$ offset by the amount of the integer slip).

Then, in step 194, the routine 126 sets the valid/invalid flag to indicate that the newly computed integer ambiguity resolution values $n_{25(i)/34/35(m)}$ in step 192 are valid. Then, these newly computed integer ambiguity resolution values $n_{25(i)/34/35(m)}$ together with the phase measurements $\Phi_{25(i)/34}$ and $\Phi_{25(i)/35(m)}$ that correspond to these values may be used by routine 125 in computing the matrix A in the way described earlier.

And finally, in step 196 the routine 126 outputs the final attitude matrix A computed for the current epoch as the complete attitude solution for that epoch.

Referring again to FIG. 8, the synthesizer 116 and the reference oscillator 115 are coupled together. The synthesizer 116 uses the reference frequency signal output by the oscillator 115 for generating a clock signal.

The clock signal generated by the synthesizer 116 is received by the signal processing stage 114 and the CPU 118. Since the CPU 118 and the signal processing stage 114 operate based on the same clock source, the carrier phase measurements made for each of the GPS signals 25(1)–(j) are coherent (i.e. made at the same time) with respect to each other.

Many of the individual elements of the components of system 20 are known in the art. In fact, many are found in commercially available products.

Specifically, the GPS antennas 34 and 35(1)–(3) are of the type commonly known as standard hemispherical microstrip patch antennas.

The signal receiving stages 113(1)–(4), the signal processing stages 114(1)–(4), the synthesizer 115, the oscillator 117, the signal processing routine 120, and the carrier phase measuring routine 121 may be of the type commonly found in a Trimble 4000 Series GPS receiver. These are described in U.S. Pat. No. 4,754,465 which is expressly incorporated by reference herein.

Furthermore, although the invention is described with reference to a few specific embodiments, the description is illustrative of the invention and is not to be construed as limiting the invention. For example, the baseline vectors $b_{35(m)}$ for spacecraft can also be computed as described in Cohen, "Attitude Determination Using GPS", Ph.D. Thesis, Stanford University, December 1992 and in Cohen and Parkinson, "Integer Ambiguity Resolution of the GPS Carrier for Spacecraft Attitude Determination", Advances in the Astronautical Sciences, 14$^{th}$ Annual AAS Guidance and Control Conference, Keystone, Colo., February 1992, which are both hereby expressly incorporated herein. And, the initialization subroutines 131 and 132 as well as the routines 125 and 126 can be utilized for spacecraft as well.

Specifically, in the case of spacecraft, the platform flexure of the spacecraft can be assumed to be negligible. Thus, the flexure state value $\delta f$ and the vectors $f^{(q)}$ can be removed from matrix systems (29), (33), and (40) so that only the vectors $\delta\Theta^{(q)}$ and n are computed at each iteration of the initialization process.

Furthermore, one skilled in the art would readily understand that the invention is applicable to attitude determinations for any land, sea, air, or space vehicle. Indeed, various modifications may occur to those skilled in the art without departing from the true spirit and scope of the invention as defined by the appended claims.

What is claimed is:

1. A GPS attitude system for determining the attitude of a moving vehicle from a plurality of GPS carrier signals, the GPS attitude system comprising:

four antennas mounted to the moving vehicle, each of the antennas receiving the GPS carrier signals;

signal receiving means for receiving the GPS carrier signals from each of the antennas;

phase measuring means for making phase measurements for the GPS carrier signals received from each of the antennas at a plurality of epochs during an initialization period and at a plurality of epochs after the initialization period, wherein the vehicle is moving while the phase measurements are made during and after the initialization period, and wherein there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

baseline computation means for computing baseline positions for the second, third, and fourth ones of the antennas with respect to the first one of the antennas at an initial one of the epochs during the initialization period and the changes in the baseline positions at subsequent ones of the epochs during the initialization period in response to the phase measurements made at the epochs during the initialization period and based on the constraint relationship at each of the subsequent ones of the epochs during the initialization period $$\Delta b_z^T b_y + \Delta b_y^T b_z = -\Delta b_y^T \Delta b_z,$$

where $b_y$ is the baseline position of the $y^{th}$ of the second, third, and fourth ones of the antennas, $b_z$ is the baseline position of the $z^{th}$ of the second, third, and fourth ones of the antennas, $\Delta b_y$ is the change in the baseline position of the $y^{th}$ of the second, third, and fourth ones of the antennas at a respective one of the subsequent epochs during the initialization period, $\Delta b_z$ is the change in the baseline position of the $z^{th}$ of the second, third, and fourth ones of the antennas at the respective one of the subsequent epochs during the initialization period, and $\Delta b_y^T \Delta b_z$ is non-zero;

initial guess computation means for computing an initial guess of the attitude of the moving vehicle at each of the epochs during the initialization period in response to the computed baseline positions and the computed changes in the baseline positions;

ambiguity resolution means for resolving the integer wavelength ambiguities in response to the computed initial guesses and the phase measurements made at the epochs during the initialization period; and attitude computation means for computing the attitude of the moving vehicle at each respective one of the epochs after the initialization period in response to the resolved integer wavelength ambiguities and the phase measurements made at the respective one of the epochs after the initialization period.

2. The GPS system of claim 1 wherein:

the ambiguity resolution means resolves the integer wavelength ambiguities in accordance with a predefined set of simultaneous equations that relate (A) the integer wavelength ambiguities, (B) the phase measurements made at the epochs during the initialization period, (C) estimates of the attitudes of the moving vehicle at the epochs during the initialization period, and (D) corrections to the estimates;

the number of GPS carrier signals and epochs during the initialization period is such that the predefined set of simultaneous equations is overdetermined;

the ambiguity resolution means iteratively resolves the integer wavelength ambiguities by (A) computing the integer ambiguities and the corrections in a plurality of iterations in accordance with the predefined set of equations, (B) in an initial one of the iterations, using the initial guesses as the estimates, and (C) in each subsequent one of the iterations, using as the estimates the estimates used in a previous one of the iterations corrected with the corrections computed in the previous one of the iterations.

3. The GPS system of claim 2 wherein the ambiguity resolution means resolves the integer wavelength ambiguities in accordance with block cholesky factorization of the predefined set of equations.

4. The GPS system of claim 1 wherein the ambiguity resolution means resolves the integer wavelength ambiguities by simultaneously resolving the integer wavelength ambiguities and determining the state of flexure of the moving vehicle during the initialization period.

5. The GPS system of claim 4 wherein:

the ambiguity resolution means simultaneously resolves the integer ambiguities and determines the state of flexure of the moving vehicle in accordance with a predefined set of simultaneous equations that relate (A) the integer wavelength ambiguities, (B) the phase measurements made at the epochs during the initialization period, (C) estimates of the attitudes of the moving vehicle at the epochs during the initialization period, (D) corrections to the estimates, and (E) the state of flexure;

the number of GPS carrier signals and epochs during the initialization period is such that the predefined set of simultaneous equations is overdetermined;

the ambiguity resolution means iteratively and simultaneously resolves the integer wavelength ambiguities and determines the state of flexure of the moving vehicle by (A) computing the integer ambiguities, the corrections, and the state of flexure in a plurality of iterations in accordance with the predefined set of equations, (B) in an initial one of the iterations, using the initial guesses as the estimates, and (C) in each subsequent one of the iterations, using as the estimates the estimates used in a previous one of the iterations corrected by the corrections computed in the previous one of the iterations.

6. The GPS system of claim 5 wherein the ambiguity resolution means resolves the integer wavelength ambiguities in accordance with block cholesky factorization of the predefined set of equations.

7. A method of determining the attitude of a moving vehicle from a plurality of GPS carrier signals, the method comprising the steps of:

receiving the GPS carrier signals with each of four antennas mounted to the moving vehicle;

receiving the GPS carrier signals from each of the antennas;

making phase measurements for the GPS carrier signals received from each of the antennas at a plurality of epochs during an initialization period and at a plurality of epochs after the initialization period, wherein the vehicle is moving while the phase measurements are made during and after the initialization period, and wherein there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

computing baseline positions for the second, third, and fourth ones of the antennas with respect to the first one of the antennas at an initial one of the epochs during the initialization period and the changes in the baseline positions at subsequent ones of the epochs during the initialization period in response to the phase measurements made at the epochs during the initialization period and based on the constraint relationship at each of the subsequent ones of the epochs during the initialization period $$\Delta b_z^T b_y + \Delta b_y^T b_z = -\Delta b_y^T \Delta b_z,$$

where $b_y$ is the baseline position of the $y^{th}$ of the second, third, and fourth ones of the antennas, $b_z$ is the baseline position of the $z^{th}$ of the second, third, and fourth ones of the antennas, $\Delta b_y$ is the change in the baseline position of the $y^{th}$ of the second, third, and fourth ones of the antennas at a respective one of the subsequent epochs during the initialization period, $\Delta b_z$ is the change in the baseline position of the $z^{th}$ of the second, third, and fourth ones of the antennas at the respective one of the subsequent epochs during the initialization period, and $\Delta b_y^T \Delta b_z$ is non-zero;

computing an initial guess of the attitude of the moving vehicle at each of the epochs during the initialization period in response to the computed baseline positions and the computed changes in the baseline positions;

resolving the integer wavelength ambiguities in response to the computed initial guesses and the phase measurements made at the epochs during the initialization period; and computing the attitude of the moving vehicle at each respective one of the epochs after the initialization period in response to the resolved integer wavelength ambiguities and the phase measurements made at the respective one of the epochs after the initialization period.

8. The method of claim 7 wherein:

the integer wavelength ambiguities are resolved in the ambiguity resolving step in accordance with a predefined set of simultaneous equations that relate (A) the integer wavelength ambiguities, (B) the phase measurements made at the epochs during the initialization period, (C) estimates of the attitudes of the moving vehicle at the epochs during the initialization period, and (D) corrections to the estimates;

the number of GPS carrier signals and epochs during the initialization period is such that the predefined set of simultaneous equations is overdetermined;

the integer wavelength ambiguities are iteratively resolved in accordance with the predefined set of equations in the ambiguity resolving step by (A) computing the integer ambiguities and the corrections in a plurality of iterations, (B) in an initial one of the iterations, using the initial guesses as the estimates, and (C) in each subsequent one of the iterations, using as the estimates the estimates used in a previous one of the iterations corrected with the corrections computed in the previous one of the iterations.

9. The method of claim 8 wherein the integer wavelength ambiguities are iteratively resolved in the ambiguity resolving step in accordance with block cholesky factorization of the predefined set of equations.

10. The method of claim 7 wherein the integer wavelength ambiguities are resolved in the ambiguity resolving step by simultaneously resolving the integer wavelength ambiguities and determining the state of flexure of the moving vehicle during the initialization period.

11. The method of claim 10 wherein:

the integer wavelength ambiguities are resolved and the state of flexure of the moving vehicle is determined in the ambiguity resolving step in accordance with a predefined set of simultaneous equations that relate (A) the integer wavelength ambiguities, (B) the phase measurements made at the epochs during the initialization period, (C) estimates of the attitudes of the moving vehicle at the epochs during the initialization period, (D) corrections to the estimates, and (E) the state of flexure;

the number of GPS carrier signals and epochs during the initialization period is such that the predefined set of simultaneous equations is overdetermined;

the integer wavelength ambiguities are resolved and the state of flexure of the moving vehicle is determined iteratively and simultaneously in the ambiguity resolving step by (A) computing the integer ambiguities, the corrections, and the state of flexure in a plurality of iterations in accordance with the predefined set of equations, (B) in an initial one of the iterations, using the initial guesses as the estimates, and (C) in each subsequent one of the iterations, using as the estimates the estimates used in a previous one of the iterations corrected by the corrections computed in the previous one of the iterations.

12. The method of claim 11 wherein the integer wavelength ambiguities are resolved and the state of flexure of the moving vehicle is determined iteratively and simultaneously in the ambiguity resolving step in accordance with block cholesky factorization of the predefined set of equations.

13. A GPS attitude system for determining the attitude of a moving vehicle from a plurality of GPS carrier signals, the GPS attitude system comprising:

four antennas mounted to the moving vehicle, each of the antennas receiving the GPS carrier signals;

signal receiving means for receiving the GPS carrier signals from each of the antennas;

phase measuring means for making phase measurements for the GPS carrier signals received from each of the antennas at a plurality of epochs during an initialization period and at a plurality of epochs after the initialization period, wherein there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

ambiguity resolution means for simultaneously resolving the integer wavelength ambiguities and determining the state of flexure of the moving vehicle during the initialization period in response to the phase measurements made at the epochs during the initialization period;

attitude computation means for computing the attitude of the moving vehicle at each respective one of the epochs after the initialization period in response to the resolved integer wavelength ambiguities and the phase measurements made at the respective one of the epochs after the initialization period.

14. The GPS system of claim 13 further comprising:

initial guess computation means for computing an initial guess of the attitude of the moving vehicle at each of the epochs during the initialization period;

the ambiguity resolution means simultaneously resolving the integer wavelength ambiguities and determining the state of flexure of the moving vehicle in accordance with a predefined set of simultaneous equations that relate (A) the integer wavelength ambiguities, (B) the phase measurements made at the epochs during the initialization period, (C) estimates of the attitudes of the moving vehicle at the epochs during the initialization period, (D) corrections to the estimates, and (E) the state of flexure;

the number of GPS carrier signals and epochs during the initialization period being such that the predefined set of simultaneous equations is overdetermined;

the ambiguity resolution means iteratively and simultaneously resolving the integer wavelength ambiguities and determining the state of flexure of the moving vehicle by (A) computing the integer wavelength ambiguities, the corrections, and the state of flexure in a plurality of iterations in accordance with the predefined set of simultaneous equations, (B) in an initial one of the iterations, using the initial guesses as the estimates, and (C) in each subsequent one of the iterations, using as the estimates the estimates used in a previous one of the iterations corrected by the corrections computed in the previous one of the iterations.

15. The GPS system of claim 14 wherein the ambiguity resolution means resolves the integer wavelength ambiguities in accordance with block cholesky factorization of the predefined set of equations.

16. The GPS system of claim 13 wherein the attitude computation means simultaneously computes the attitude and determines the state of flexure of the moving vehicle at each one of the epochs after the initialization period.

17. A method of determining the attitude of a moving vehicle from a plurality of GPS carrier signals, the method comprising:

receiving the GPS carrier signals with each of four antennas mounted to the moving vehicle;

receiving the GPS carrier signals from each of the antennas;

making phase measurements for the GPS carrier signals received from each of the antennas at a plurality of epochs during an initialization period and at a plurality of epochs after the initialization period, wherein there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

simultaneously resolving the integer wavelength ambiguities and determining the state of flexure of the moving vehicle during the initialization period in response to the phase measurements made at the epochs during the initialization period;

computing the attitude of the moving vehicle at each respective one of the epochs after the initialization period in response to the resolved integer wavelength ambiguities and the phase measurements made at the respective one of the epochs after the initialization period.

18. The GPS system of claim 17 further comprising the step of:

computing an initial guess of the attitude of the moving vehicle at each of the epochs during the initialization period;

the integer wavelength ambiguities are resolved and the state of flexure of the moving vehicle are determined simultaneously in the ambiguity resolving step in accordance with a predefined set of simultaneous equations that relate (A) the integer wavelength ambiguities, (B) the phase measurements made at the epochs during the initialization period, (C) estimates of the attitudes of the moving vehicle at the epochs during the initialization period, (D) corrections to the estimates, and (E) the state of flexure;

the number of GPS carrier signals and epochs during the initialization period being such that the predefined set of simultaneous equations is overdetermined;

the integer wavelength ambiguities being resolved and the state of flexure of the moving vehicle being determined iteratively and simultaneously by (A) computing the integer wavelength ambiguities, the corrections, and the state of flexure in a plurality of iterations in accordance with the predefined set of simultaneous equations, (B) in an initial one of the iterations, using the initial guesses as the estimates, and (C) in each subsequent one of the iterations, using as the estimates the estimates used in a previous one of the iterations corrected by the corrections computed in the previous one of the iterations.

19. The method of claim 18 wherein the integer wavelength ambiguities are resolved and the state of flexure of the moving vehicle is determined iteratively and simultaneously in the ambiguity resolving step in accordance with block cholesky factorization of the predefined set of equations.

20. The method of claim 17 wherein the attitude of the moving vehicle is computed and the state of flexure of the moving vehicle is determined simultaneously at each one of the epochs after the initialization period in the attitude computing step.

21. A GPS attitude system for determining the attitude of a moving vehicle from a plurality of GPS carrier signals, the GPS attitude system comprising:

a plurality of antennas mounted to the moving vehicle, each of the antennas receiving the GPS carrier signals;

signal receiving means for receiving the GPS signals from each of the antennas;

phase measuring means for making phase measurements for the GPS carrier signals received from each of the antennas at a plurality of epochs;

attitude computation means for simultaneously computing the attitude and determining the state of flexure of the moving vehicle at each respective one of the epochs in response to the phase measurements made at the respective one of the epochs.

22. The GPS attitude system of claim 21 wherein:

the plurality of antennas comprises four antennas;

there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

the GPS attitude system further comprises ambiguity resolution means for resolving the integer wavelength ambiguities;

the attitude computation means simultaneously computes the attitude and determines the state of flexure of the moving vehicle at each respective one of the epochs also in response to the resolved integer wavelength ambiguities.

23. The GPS system of claim 22 wherein:

the attitude computation means simultaneously computes the attitude and determines the state of flexure of the moving vehicle at each respective one of the epochs after the initialization period in accordance with a predefined set of simultaneous equations that relate (A) the resolved integer wavelength ambiguities, (B) the phase measurements made at the respective one of the epochs, (C) an estimate of the attitude of the moving vehicle at the respective one of the epochs, (D) a correction to the estimate of the attitude, (E) an estimate of the state of flexure of the moving vehicle at the respective one of the epochs, and (F) a correction to the estimate of the state of flexure;

the attitude computation means iteratively and simultaneously computes the attitude and determines the state of flexure of the moving vehicle at each respective one of the epochs by (A) computing the corrections to the estimates of the attitude and the state of flexure in a plurality of iterations in accordance with the predefined set of simultaneous equations, (B) in each respective one of the iterations, using as the estimates of the attitude and the state of flexure the estimates of the attitude and the state of flexure used in a directly preceding one of the iterations corrected by the corrections to the estimates of the attitude and state of flexure computed in the directly preceding one of the iterations.

24. A method of determining the attitude of a moving vehicle from a plurality of GPS carrier signals, the method comprising:

receiving the GPS carrier signals with each of a plurality of antennas mounted to the moving vehicle;

receiving the GPS signals from each of the antennas;

making phase measurements for the GPS carrier signals received from each of the antennas at a plurality of epochs;

simultaneously computing the attitude and determining the state of flexure of the moving vehicle at each respective one of the epochs in response to the phase measurements made at the respective one of the epochs.

25. The method of claim 24 wherein:

the plurality of antennas comprises four antennas;

there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

the method further comprises the step of resolving the integer wavelength ambiguities;

the attitude of the moving vehicle is computed and the state of flexure of the moving vehicle is determined simultaneously at each respective one of the epochs in the attitude computing step also in response to the resolved integer wavelength ambiguities.

26. The method of claim 25 wherein:

the attitude of the moving vehicle is computed and the state of flexure of the moving vehicle is determined simultaneously at each respective one of the epochs after the initialization period in the attitude computing step in accordance with a predefined set of simultaneous equations that relate (A) the resolved integer wavelength ambiguities, (B) the phase measurements made at the respective one of the epochs, (C) an estimate of the attitude of the moving vehicle at the respective one of the epochs, (D) a correction to the estimate of the attitude, (E) an estimate of the state of flexure of the moving vehicle at the respective one of the epochs, and (F) a correction to the estimate of the state of flexure;

the attitude of the moving vehicle is computed and the state of flexure of the moving vehicle is determined iteratively and simultaneously at each respective one of the epochs after the initialization period in the attitude computing step by (A) computing the corrections to the estimates of the attitude and the state of flexure in a plurality of iterations in accordance with the predefined set of simultaneous equations, (B) in each respective one of the iterations, using as the estimates of the attitude and the state of flexure the estimates of the attitude and the state of flexure used in a directly preceding one of the iterations corrected by the corrections to the estimates of the attitude and state of flexure computed in the directly preceding one of the iterations.

27. A GPS attitude system for determining the attitude of a moving vehicle from a plurality of GPS carrier signals, the GPS attitude system comprising:

four antennas mounted to the moving vehicle, each of the antennas receiving the GPS carrier signals;

signal receiving means for receiving the GPS signals from each of the antennas;

phase measuring means for making phase measurements for the GPS carrier signals received from each of the antennas at a plurality of epochs during an initialization period and at a plurality of epochs after the initialization period, wherein there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

ambiguity resolution means for (A) resolving the integer wavelength ambiguities, and (B) generating a status report indicating that the resolved integer ambiguities are valid;

integrity checking means for (A) determining when an erroneous integer wavelength change has occurred in the phase measurement made for a particular one of the GPS carrier signals received by a particular one of the antennas at a particular one of the epochs after the initialization period, the erroneous integer wavelength change creating one or more new integer wavelength ambiguities associated with the phase measurements made for the particular one of the GPS carrier signals received by the particular one of the antennas at succeeding ones of the epochs after the initialization period, and (B) updating the status report to indicate that each one of the resolved integer wavelength ambiguities associated with the phase measurement made for the particular one of the GPS carrier signals received by the particular one of the antennas at the particular one of the epochs is no longer valid;

attitude computation means for computing the attitude of the moving vehicle at each respective one of the epochs after the initialization period in response to the resolved integer wavelength ambiguities designated as being valid in the status report and the phase measurements made at the respective one of the epochs after the initialization period associated with the resolved integer ambiguities designated as being valid in the status report;

the integrity checking means also (C) resolving the new integer wavelength ambiguities in response to the attitude of the moving vehicle computed at an initial one of the succeeding ones of the epochs after the initialization period and the phase measurements made at the initial one of the succeeding ones of the epochs after the initialization period associated with the new integer wavelength ambiguities, and (D) updating the status report to indicate that the resolved new integer wavelength ambiguities are valid.

28. A method of determining the attitude of a moving vehicle from a plurality of GPS carrier signals, the method comprising:

receiving the GPS carrier signals with each of four antennas mounted to the moving vehicle;

receiving the GPS signals from each of the antennas;

making phase measurements for the GPS carrier signals received from each of the antennas at a plurality of epochs during an initialization period and at a plurality of epochs after the initialization period, wherein there is an integer wavelength ambiguity associated with the phase measurements made for each of the GPS carrier signals received from a first one and a second one of the antennas, there is an integer wavelength ambiguity associated with the phase measurements made for each of the GPS carrier signals received from the first one and a third one of the antennas, and there is an integer wavelength ambiguity associated with the phase measurements made for each of the GPS carrier signals received from the first one and a fourth one of the antennas;

resolving the integer wavelength ambiguities;

generating a status report indicating that the resolved integer ambiguities are valid;

determining when an erroneous integer wavelength change has occurred in the phase measurement made for a particular one of the GPS carrier signals received by a particular one of the antennas at a particular one of the epochs after the initialization period, the erroneous integer wavelength change creating one or more new integer wavelength ambiguities associated with the phase measurements made for the particular one of the GPS carrier signals received by the particular one of the antennas at succeeding ones of the epochs after the initialization period;

updating the status report to indicate that each one of the resolved integer wavelength ambiguities associated with the phase measurement made for the particular one of the GPS carrier signals received by the particular one of the antennas at the particular one of the epochs is no longer valid;

computing the attitude of the moving vehicle at each respective one of the epochs after the initialization period in response to the resolved integer wavelength ambiguities designated as being valid in the status report and the phase measurements made at the respective one of the epochs after the initialization period associated with the resolved integer ambiguities;

resolving the new integer wavelength ambiguities in response to the attitude of the moving vehicle computed at an initial one of the succeeding ones of the epochs after the initialization period and the phase measurements made at the initial one of the succeeding ones of the epochs after the initialization period associated with the new integer wavelength ambiguities; and updating the status report to indicate that the resolved new integer wavelength ambiguities are valid.

* * * * *